US011907945B2

(12) United States Patent
Jones et al.

(10) Patent No.: US 11,907,945 B2
(45) Date of Patent: Feb. 20, 2024

(54) REAL-TIME DETERMINATION OF COUNTERPARTY GEOLOCATION BASED ON STRUCTURED MESSAGING DATA

(71) Applicant: The Toronto-Dominion Bank, Toronto (CA)

(72) Inventors: Christopher Mark Jones, Villanova, PA (US); Barry Wayne Baird, Jr., Kennett Square, PA (US); Claude Bernell Lawrence, Jr., Philadelphia, PA (US); Jonathan Joseph Prendergast, West Chester, PA (US)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/902,386

(22) Filed: Sep. 2, 2022

(65) Prior Publication Data
US 2022/0414656 A1 Dec. 29, 2022

Related U.S. Application Data

(63) Continuation of application No. 17/082,587, filed on Oct. 28, 2020, now Pat. No. 11,468,443.
(Continued)

(51) Int. Cl.
*G06Q 20/32* (2012.01)
*G06Q 20/40* (2012.01)
(Continued)

(52) U.S. Cl.
CPC ............ *G06Q 20/40* (2013.01); *G06Q 20/10* (2013.01); *G06Q 20/3224* (2013.01); *G06Q 30/0238* (2013.01); *G06Q 30/0261* (2013.01)

(58) Field of Classification Search
USPC .............................................. 705/1.1, 35, 44
See application file for complete search history.

(56) References Cited

U.S. PATENT DOCUMENTS 7,487,112 B2   2/2009   Barnes, Jr.
8,615,426 B2   12/2013  Carlson
(Continued)

FOREIGN PATENT DOCUMENTS

AU   2013206122 B2 *  7/2014   ........... G01C 21/005
AU   2013206122 B2    7/2014
(Continued)

*Primary Examiner* — William E Rankins
(74) *Attorney, Agent, or Firm* — Duane Morris LLP

(57) ABSTRACT

The disclosed embodiments include computer-implemented processes that determine, in real time, counterparty geolocation location based on structured messaging data, such as messaging data maintained within message fields of a request-for-payment (RFP) message compliant with the ISO 20022. For example, an apparatus may receive a RFP message that includes message data associated with a transaction involving first and second counterparties, and the RFP message may characterize a real-time payment requested from the second counterparty by the first counterparty. The apparatus may determine a geographic position of the first counterparty based the message data, and based on the first geographic position, transmit notification data to a device operable by the second counterparty. The notification data may cause the device to present digital content associated with at least one of the transaction, the first counterparty, or the second counterparty within a digital interface.

20 Claims, 9 Drawing Sheets

Related U.S. Application Data

(60) Provisional application No. 63/063,754, filed on Aug. 10, 2020.

(51) Int. Cl.
*G06Q 20/10* (2012.01)
*G06Q 30/0238* (2023.01)
*G06Q 30/0251* (2023.01)

(56) References Cited

U.S. PATENT DOCUMENTS

| | | | |
|---|---|---|---|
| 9,412,118 B2 * | 8/2016 | Loomis | G06Q 20/387 |
| 2013/0246220 A1 * | 9/2013 | Hammad | G06Q 30/0267 |
| | | | 705/26.9 |
| 2014/0067677 A1 * | 3/2014 | Ali | G06Q 20/385 |
| | | | 705/44 |
| 2015/0228031 A1 * | 8/2015 | Emison | G06Q 10/047 |
| | | | 705/4 |
| 2015/0310490 A1 | 10/2015 | Meredith et al. | |
| 2017/0221066 A1 | 8/2017 | Ledford et al. | |
| 2019/0114666 A1 | 4/2019 | Kohli | |

FOREIGN PATENT DOCUMENTS

| | | | | |
|---|---|---|---|---|
| CN | 104321738 B | * | 6/2018 | G06F 16/93 |
| CN | 104321738 B1 | | 6/2018 | |

\* cited by examiner

| | | |
|---|---|---|
| Requested Execution Date | 2020-12-01 | ← 228 |
| | | |
| Debtor | | |
|   Name | John Q. Stone | |
|   Postal Address | | |
|     Street Name | Eye Street NW | |
|     Building Number | 2220 | ← 232 |
|     Postal Code | 20037 | |
|     Town Name | Washington, D.C. | |
|     Country | US | |
| | | |
| Debtor Account | | |
|   Identification | XXXX-1234-5678-9012 | ← 234 |
| | | |
| Amount | | |
|   Instructed Amount | 6.60 | ← 230 |
|   Currency | USD | |
| | | |
| Creditor | | |
|   Name | Barry's Coffee Shop | |
|   Postal Address | | |
|     Street Name | M Street NW | |
|     Building Number | 3301 | ← 236 |
|     Postal Code | 20007 | |
|     Town Name | Washington, D.C. | |
|     Country | US | |
| | | |
| Creditor Account | | |
|   Identification | XXXX-9012-3456-7890 | ← 238 |
| | | |
| Remittance Information | | |
|   Unstructured | http://BarrysCoffeeShop.com/receipt?custid='1234'?zip='20007' | ← 244 |

REAL-TIME DETERMINATION OF COUNTERPARTY GEOLOCATION BASED ON STRUCTURED MESSAGING DATA

CROSS-REFERENCE TO RELATED APPLICATION

This application is a continuation of, and claims the benefit of priority to, U.S. application Ser. No. 17/082,587, filed on Oct. 28, 2020, which claims the benefit of priority to U.S. Provisional Patent Application No. 63/063,754, filed on Aug. 10, 2020. The disclosures of each of these applications are expressly incorporated herein by reference to their entireties.

TECHNICAL FIELD

The disclosed embodiments generally relate to computer-implemented systems and processes that determine, in real time, counterparty geolocation location based on structured messaging data.

BACKGROUND

Today, the mass adoption of smart phones and digital payments within the global marketplace drives an increasingly rapid adoption of real-time payment (RTP) technologies by financial institutions, consumers, vendors and merchants, and other participants in the payment ecosystem. Many RTP technologies emphasize data, messaging, and global interoperability and in contrast to many payment rails, such as those that support credit card payments, embrace the near ubiquity of mobile technologies in daily life to provide, to the participants in the RTP ecosystem, real-time service and access to funds.

SUMMARY

In some examples, an apparatus includes a communications interface, a memory storing instructions, and at least one processor coupled to the communications interface and to the memory. The at least one processor is configured to execute the instructions to receive, via the communications interface, a message associated with a transaction involving a first counterparty and a second counterparty. The message includes elements of message data disposed within corresponding message fields, and the message data characterizes a real-time payment requested from the second counterparty by the first counterparty. The at least one processor is further configured to determine a first geographic position of the first counterparty based on one or more of the elements of message data, generate notification data based on the first geographic position, and transmit, via the communications interface, the notification data to a device operable by the second counterparty. The notification data includes digital content associated with at least one of the transaction, the first counterparty, or the second counterparty, and the notification data causes an application program executed at the device to present the digital content within a digital interface.

In other examples, a computer-implemented method includes receiving, using at least one processor, a message associated with a transaction involving a first counterparty and a second counterparty. The message includes elements of message data disposed within corresponding message fields, and the message data characterizes a real-time payment requested from the second counterparty by the first counterparty. The computer-implemented method also includes determining, using the at least one processor, a first geographic position of the first counterparty based on one or more of the elements of message data. Further, the computer-implemented method includes, using the at least one processor, generating notification data based on the first geographic position, and transmitting the notification data to a device operable by the second counterparty. The notification data comprising digital content associated with at least one of the transaction, the first counterparty, or the second counterparty, and the notification data causing an application program executed at the device to present the digital content within a digital interface.

Additionally, in some examples, a tangible, non-transitory computer-readable medium stores instructions that, when executed by at least one processor, cause the at least one processor to perform a method that includes receiving a message associated with a transaction involving a first counterparty and a second counterparty. The message includes elements of message data disposed within corresponding message fields, and the message data characterizes a real-time payment requested from the second counterparty by the first counterparty. The method also includes determining a first geographic position of the first counterparty based on one or more of the elements of message data, generating notification data based on the first geographic position, and transmitting the notification data to a device operable by the second counterparty. The notification data includes digital content associated with at least one of the transaction, the first counterparty, or the second counterparty, and the notification data causes an application program executed at the device to present the digital content within a digital interface.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

BRIEF DESCRIPTION OF THE DRAWINGS

FIG. 2B illustrates portions of an exemplary request for payment (RFP), in accordance with some exemplary embodiments.

DETAILED DESCRIPTION

Figure 1:
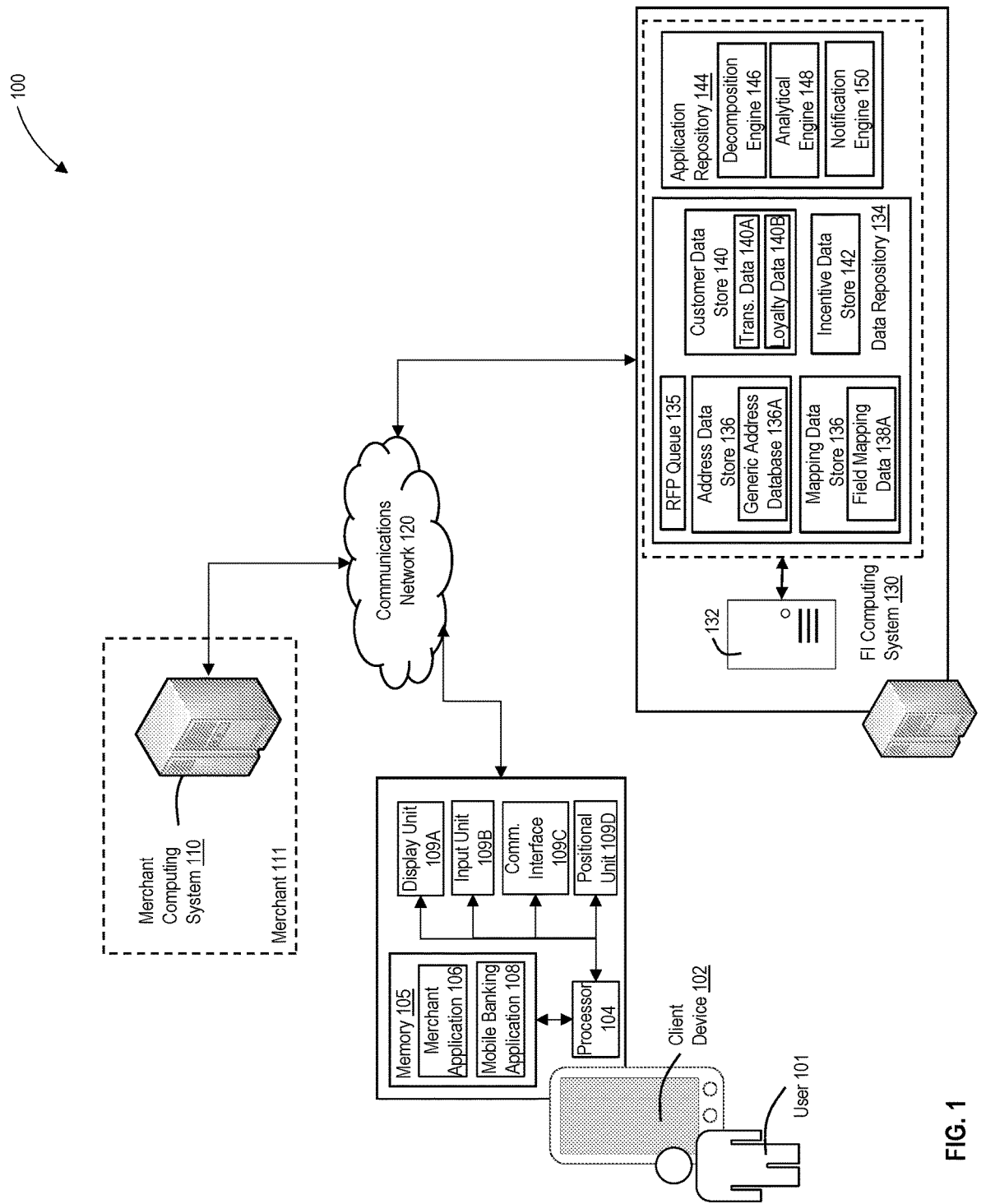
FIG. 1 is a block diagram of an exemplary computing environment, in accordance with some exemplary embodiments.

This specification relates to exemplary computer-implemented processes that, based on elements of structured or unstructured message data characterizing an exchange of data initiated between a first counterparty and a second counterparty, determine one or more geographic locations associated with the initiated data exchange, and provision, to a computing system or device operable by the second counterparty, one or more elements of digital content associated with at least one of the initiated data exchange, the first counterparty, or the one or more determined geographic locations. In some instances, certain of the exemplary computer-implemented processes described herein may determine the one or more geographic locations associated with the initiated data exchange, and identify and provision the one or elements of digital content to the computing device or system operable by the second counterparty, in real-time and contemporaneously with the initiation of the data exchange.

By way of example, the first counterparty may correspond to a merchant that offers products or services for sale to one or more customers, such as, but not limited to, the second counterparty, and the initiated data exchange may include a purchase transaction initiated by the customer and involving one or more of the products or goods offered for sale by the merchant. Further, and as described herein, the customer may be associated with, or operate, a computing system or device (e.g. a "client device") that executes one or more locally maintained application programs, such as, but not limited to, a web browser or a mobile application program associated with the merchant (e.g., a merchant application).

In some instances, the customer may access a digital portal associated with the merchant (e.g., via the merchant application executed by the client device), and may provide input to the digital portal (e.g., via an input unit of the client device) that initiates the purchase transaction and further, that identifies the one or more products or services involved in the initiated purchase transaction and a payment instrument available to fund the initiated purchase transaction. For example, the payment instrument may include, but is not limited to, a credit card account issued by a financial institution of the customer, or a checking, savings, or other deposit account issued by and maintained at the financial institution. Based on the received customer input, the executed merchant application may generate elements of transaction data that characterize the initiated purchase transaction, including information identifying the one or more involved products or services and the payment instrument, and the client device may transmit the elements of transaction data across a communications network to a computing system associated with the merchant.

As described herein, the merchant computing system may receive the transaction data associated with the initiated purchase transaction, which identifies, among other things, the one or more products or services involved in the initiated purchase transactions and the payment instrument available to fund the initiated purchase transaction. In some examples, the merchant computing system may perform operations that authorize the initiated purchase transaction using the available payment instrument, e.g., based on data exchanged programmatically with a computing system associated with an issuer of the payment instrument. In response to a successful authorization of the initiated purchase transaction, the merchant computing system may perform operations that execute the initiated purchase transaction (e.g., that trigger a provisioning of the one or more purchased products or services to the customer), and store data indicative of the authorized purchased transaction (or alternatively, the declined purchase transaction) within one or more tangible non-transitory memories.

Further, in some examples, the merchant computing may generate a transaction-processing message that includes portions of the stored data characterizing the now-authorized transaction, and may transmit the transaction-processing message to a computing system associated with a transaction processing network (e.g., a payment rail), which may perform additional operations that reconcile, settle, and clear the authorized purchase transaction in accordance with the stored transaction data. For instance, the merchant computing system may generate, and transmit, the transaction-processing message to the computing system associated with the transaction processing networks at predetermined intervals subsequent to the initiation and approval of the purchase transaction, such as, but not limited to, at a completion of a business day or a completion of a calendar day. Further, and upon completion of the reconciliation, clearance, and settlement processes at the predetermined intervals, funds associated with the purchase transaction may be credited to an account held by the merchant, and may be accessible to that merchant for withdrawal from the merchant's financial institution.

In other instances, and responsive to the receipt of the transaction data associated with the initiated purchase transaction, the merchant computing system may implement one or more real-time payment (RTP) technologies. Based on the implementation of the one or more RTP technologies, the merchant computing system may generate elements of messaging data that request, from the customer, payment for the one or more purchased products or services in real-time and contemporaneously with the initiated purchase transaction, e.g., a "real-time" payment. For example, the generated elements of messaging data may populate, and be maintained within, message fields of a request-for-payment (RFP) message formatted and structured in accordance with one or more standardized data-exchange protocols, such as the ISO 20022 standard for electronic data exchange between financial institutions.

As described herein, the message fields of the RFP message may include discrete elements of structured or unstructured data that identify and characterize the initiated purchase transaction, the available payment instrument, and the counterparties to the initiated purchase transaction, e.g., the customer and the merchant. For example, the message fields of the RFP message may include, but are not limited to structured elements of customer data that identify the customer (e.g., a name of the customer, a unique, alphanumeric identifier assigned to the customer, etc.), and structured elements of merchant data that identify the merchant (e.g., a merchant name, a standard industrial classification (SIC) code, etc.) and one or more portions of a postal address associated with the merchant. The message fields of the RFP message may also include, but are not limited to, structured elements of transaction data that characterize the initiated purchase transaction (e.g., a total transaction amount, a pre-tax transaction amount, a transaction time or date, etc.) and structured elements of payment data identifying and characterizing the payment instrument that funds the initiated purchase transaction (e.g., a payment method, a requested payment account, identifiers of a source account and a destination account associated with a requested transfer of funds, etc.). Further, in some examples, the message fields of the RFP message may also include a hyperlink to additional information, such as remittance data, that characterizes the initiated purchase transactions and is maintained by one or more computing systems, such as the merchant computing system described herein.

In some examples, the elements of structured or unstructured data maintained within the message fields of exemplary, ISO-20022-compliant RFP messages described herein may extend beyond the often-limited content of the message data transmitted across many payment rails and transaction processing networks. Further, when intercepted and processed by a computing system of the financial institution of the customer (e.g., an FI computing system), these elements of structured or unstructured RFP message data may be processed by the FI computing system to obtain or derive additional information characterizing the purchase transaction, the customer, or the merchant, and to provision, to the customer device, elements of digital content of relevance to the purchase transaction, the customer, or the merchant in real time and contemporaneously with the initiation of the transaction. Certain of these exemplary processes, which leverage ISO-20022-compliant RFP messages to provision digital content to a device of a customer in real-time and contemporaneously with a transaction initiated by that customer derive, may be implemented in addition to, or as an alternate to, processes involving payment rails, transaction-processing messages, and corresponding messaging protocols, which provision data characterizing a cleared and settled transaction to the computing system of the customer's financial institution subsequent to the initiation of the transaction.

Further, and upon interception of an ISO-20022-compliant RFP message associated with a transaction involving the merchant and the customer, such as the purchase transaction described herein, the FI computing system provision a payment notification to an application program executed at the customer device that, upon presentation within a corresponding digital interface, prompts the customer to provide an approval of the real-time payment requested by the merchant, e.g., contemporaneously with the initiated transaction. Certain of the exemplary RTP processes described herein may, when implemented collectively by the computing systems of the merchant's and customer's financial institution, facilitate a reconciliation, settlement, and clearance of the initiated transaction in real-time and without conventional payment rails and transaction processing network, and may reduce instances of fraudulent activity and chargebacks characteristic of the transaction reconciliation, clearance, and settlement processes involving payment rails and transaction processing-messages, e.g., as the merchant computing system receives the customer's approval of the requested payment contemporaneously with the initiation of the transaction and prior to any provisioning of the one or more purchased products or services to the customer.

I. Exemplary Computing Environments

FIG. 1 is a diagram illustrating an exemplary computing environment 100 that includes, among other things, one or more computing devices, such as a client device 102, and one or more computing systems, such as a merchant computing system 110 and a financial institution (FI) system 130, each of which may be operatively connected to, and interconnected across, one or more communications networks, such as communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

Client device 102 may include a computing device having one or more tangible, non-transitory memories, such as memory 105, that store data and/or software instructions, and one or more processors, e.g., processor 104, configured to execute the software instructions. The one or more tangible, non-transitory memories may, in some aspects, store software applications, application modules, and other elements of code executable by the one or more processors, such as, but not limited to, an executable web browser (e.g., Google Chrome™, Apple Safari™, etc.), an executable application associated with merchant computing system 110 (e.g., merchant application 106), and additionally or alternatively, an executable application associated with FI computing system 130 (e.g., mobile banking application 108).

In some instances, not illustrated in FIG. 1, memory 105 may also include one or more structured or unstructured data repositories or databases, and client device 102 may maintain one or more elements of device data and location data within the one or more structured or unstructured data repositories or databases. For example, the elements of device data may uniquely identify client device 102 within computing environment 100, and may include, but are not limited to, an Internet Protocol (IP) address assigned to client device 102 or a media access control (MAC) layer assigned to client device 102. Further, the elements of location data may include data that identifies geographic locations of client device 102 at corresponding times or dates (e.g., a latitude, longitude, or altitude measured by an on-board positional unit 109D at regular temporal intervals).

Client device 102 may also include a display unit 109A configured to present interface elements to a corresponding user, such as a user 101, and an input unit 109B configured to receive input from user 101, e.g., in response to the interface elements presented through display unit 109A. By way of example, display unit 109A may include, but is not limited to, an LCD display unit or other appropriate type of display unit, and input unit 109B may include, but is not limited to, a keypad, keyboard, touchscreen, voice activated control technologies, or appropriate type of input unit. Further, in additional aspects (not illustrated in FIG. 1), the functionalities of display unit 109A and input unit 109B may be combined into a single device, e.g., a pressure-sensitive touchscreen display unit that presents interface elements and receives input from user 101. Client device 102 may also include a communications interface 109C, such as a wireless transceiver device, coupled to processor 104 and configured by processor 104 to establish and maintain communications with communications network 120 via one or more communication protocols, such as WiFi®, Bluetooth®, NFC, a cellular communications protocol (e.g., LTE®, CDMA®, GSM®, etc.), or any other suitable communications protocol.

Further, and as described herein, client device 102 may include a positional unit 109D coupled to processor 104 and configured by processor 104 to determine a geographic location of client device 102 (e.g., a longitude, latitude, altitude, etc.) at regular temporal intervals, and to store data indicative of the determined geographic location within a portion of corresponding tangible, non-transitory memory (e.g., as one or more of the elements of location data described herein), along with data identifying the temporal interval (e.g., a time stamp specifying a corresponding time and/or date). Examples of positional unit 109D include, but are not limited to, an on-board Global Positioning System (GPS) receiver, an on-board assisted GPS (A-GPS) receiver, or a positioning unit consistent with other positioning systems.

Examples of client device 102 may include, but not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs)), an embedded computing device (e.g., in communication with a smart textile or electronic fabric), and any other type of computing device that may be configured to store data and software instructions, execute software instructions to perform operations, and/or display information on an interface device or unit, such as display unit 109A. In some instances, client device 102 may also establish communications with one or more additional computing systems or devices operating within environment 100 across a wired or wireless communications channel, e.g., via the communications interface 109C using any appropriate communications protocol. Further, user 101 may operate client device 102 and may do so to cause client device 102 to perform one or more exemplary processes described herein.

Merchant computing system 110 and FI computing system 130 may each represent a computing system that includes one or more servers and one or more tangible, non-transitory memory devices storing executable code, application engines, or application modules. Each of the one or more servers may include one or more processors, which may be configured to execute portions of the stored code, application engines, or application modules to perform operations consistent with the disclosed exemplary embodiments. For example, as illustrated in FIG. 1, the one or more servers of FI computing system 130 may include server 132 having one or more processors configured to execute portions of the stored code, application engines, or application modules maintained within the one or more corresponding, tangible, non-transitory memories. Further, each of merchant computing system 110 and FI computing system 130 may also include one or more communications units, devices, or interfaces, such as one or more wireless transceivers, coupled to the one or more processors for accommodating wired or wireless internet communication across network 120 with other computing systems and devices operating within environment 100 (not illustrated in FIG. 1).

In some instances, merchant computing system 110 and/or FI computing system 130 may correspond to a discrete computing system, although in other instances, merchant computing system 110 or FI computing system 130 may correspond to a distributed computing system having multiple, computing components distributed across an appropriate computing network, such as communications network 120 of FIG. 1A, or those established and maintained by one or more cloud-based providers, such as Microsoft Azure™, Amazon Web Services™, or another third-party, cloud-services provider. Further, in some instances, one or more of merchant computing system 110 and FI computing system 130 may be incorporated into a single computing system, or may be incorporated into multiple computing systems.

By way of example, merchant computing system 110 may be associated with, or operated by, a merchant 111 that offers products or services for sale to one or more customers, such as, but not limited to, user 101 that operates client device 102. In some instances, merchant computing system 110 may exchange data programmatically with one or more application programs executed at client device 102, such as merchant application 106, and based on the programmatically exchanged data, client device 102 may perform any of the exemplary processes described herein to initiate a transaction to purchase one or more of the products or services offered for sale by merchant 111. Further, and as described herein, FI computing system 130 may be associated with, or operated by, a financial institution that offers financial products or services to one or more customers, such as, but not limited to, user 101. The financial products or services may, for example, include a payment instrument issued to user 101 by the financial institution and available to fund the initiated purchase transaction, and examples of the payment instrument may include, but are not limited to, a credit card account issued by the financial institution or a checking, savings, or other deposit account issued by and maintained at the financial institution.

In some instances, FI computing system 130 may perform any of the exemplary processes described herein to obtain, receive, or intercept a request-for-payment (RFP) message associated with the initiated purchase transaction between a first counterparty (e.g., merchant 111 of FIG. 1) and a second counterparty (e.g., user 101 of FIG. 1). As described herein, the received RFP message may be formatted and structured in accordance with one or more standardized data-exchange protocols, such as the ISO 20022 standard for electronic data exchange between financial institutions. Further, and based on elements of mapping data that characterize a structure, composition, or format of one or more data fields of the ISO-20002-compliant RFP message, FI computing system 130 may perform any of the exemplary processes described herein to decompose the received RFP message and obtain data characterizing user 101, merchant 111, and additionally, or alternatively, the initiated purchase transaction.

FI computing system 130 may also perform any of the exemplary processes described herein to determine, or infer, a first geographic position of the first counterparty (e.g., a geographic position associated with merchant 111) based on the data obtained from the message fields of the received RFP message. In some instances, the first geographic position of the first counterparty may correspond to an intended or expected position of the second counterparty during a temporal interval, e.g., an end point of a route travelled by client device 102 between a second geographic position of the second counterparty (e.g., a current geographic position of client device 102) and the first geographic position during that temporal interval.

Further, and based on at least the first geographic position of the first counterparty, FI computing system 130 may perform any of the exemplary processes described herein to identify, and obtain, one or more elements of digital content associated with the initiated purchase transaction or the first counterparty and further, of potential interest to user 101. The one or more elements of digital content may, for example, establish an incentive for user 101 to purchase an additional product or service from merchant 111 (e.g., a "spur-of-the-moment" purchase), or to purchase a product or service from additional counterparties disposed proximate to the first geographic position, the second geographic position, or to one or more geographic positions disposed along the route between the first and second counterparties. FI computing system 130 may package the one or more elements of obtained digital content into corresponding portions of a notification, which FI computing system 130 may transmit across network 120 to client device 102.

As described herein, client device 102 may receive the transmitted notification, and one or more application programs executed at client device 102, such as mobile banking application 106, may perform any of the exemplary processes described herein to present interface elements representative of all of a selected portion of the notification within one or more portions of a corresponding digital interface (e.g., via display unit 109A). For example, the presented interface elements may prompt user 101 to provide input to client device 102 (e.g., via input unit 109B) that approves the payment requested by merchant 111 for the purchase transaction (e.g., as specified by the received RFP message) in real-time and contemporaneously within the initiation of the purchase transaction. Further, in some examples, executed mobile banking application 106 may also perform any of the exemplary processes described herein to present, to user 101 within the digital interface, the one or more elements of digital content, which may be of potential relevance to the purchase transaction, user 101, or merchant 111, in real time and contemporaneously with the initiation or execution of that purchase transaction.

To facilitate a performance of one or more of these exemplary processes, FI computing system 130 may maintain, within the one or more tangible, non-transitory memories, a data repository 134 that includes, but is not limited to, a request-for-payment (RFP) message queue 135, an address data store 136, a mapping data store 138, a customer data store 140, and an incentive data store 142. RFP queue 135 may include one or more discrete RFP messages received by FI computing system 130 using any of the exemplary processes described herein. In some instances, the RFP messages maintained within RFP queue 135 may be prioritized in accordance with a time or date of receipt by FI computing system 130 or with requested payment data associated with each of the RFP messages, and each of the prioritized RFP messages may be associated with a corresponding temporal pendency. Further, FI computing system 130 may perform any of the exemplary processes described herein to provision elements of notification data associated with each of the prioritized RFP message to a computing system or device associated with a corresponding customer (e.g., client device 102 associated with user 101), and FI computing system 130 may perform operations that maintain each of the prioritized RFP messages within RFP queue 135 until a receipt, at FI computing system 130, of confirmation data from corresponding ones of the computing systems or devices indicating an approval, or a rejection, of the corresponding requested payment, or until an expiration of the corresponding pendency period.

Address data store 136 may include one or more structured or unstructured data records that establish a database 136A of "generic" postal addresses, which may be associated with potential counterparties (e.g., merchants, retailers, etc.) to purchase transactions involving customers of the financial institution, such as purchase transactions involving user 101 and initiated at client device 102 using any of the exemplary processes described herein. For example, each of the structured or unstructured data records of the established database may include an identifier of the potential counterparty (e.g., a merchant name) and all, or a selected portion, of a generic postal address associated with that potential counterparty. In some instances, the generic postal address for each of the potential counterparties may represent a postal address associated with a corporate parent of the potential counterparty or a postal address associated with a franchisee of the corporate parent, and not a postal address associated with an actual, physical location of the potential counterparty, e.g., from which user 101 may collect purchased products or obtain purchased services.

Mapping data store 138 may include structured or unstructured data records that maintain one or more elements of field mapping data 138A. For example, and as described herein, FI computing system 130 may receive, obtain, or intercept one or more RFP messages, each of which may be formatted and structured in accordance with a corresponding, standardized data-exchange protocol, such as the ISO 20022 standard for electronic data exchange between financial institutions. In some instances, the one or more elements of field mapping data 138A may characterize a structure, composition, or format of the message data populating one or more data fields of the ISO-20002-compliant RFP message, or a corresponding RFP message compliant with an additional, or alternate, standardized data-exchange protocol.

In some instances, customer data store 140 may include structured or unstructured data records that maintain information identifying and characterizing one or more customers of the financial institution, and further, interactions between these customers and not only the financial institution, but also other unrelated third parties, such as the merchants or retailers described herein. For example, as illustrated in FIG. 1, customer data store 140 may include one or more elements of transaction data 140A, which identify and characterize prior purchase transactions involving the customers of the financial institution (such as, but not limited to, user 101), and one or more elements of loyalty data 140B, which identify and characterize one or more merchant- or retailer-specific loyalty programs in which the customers of the financial institution participate (e.g., one or more loyalty programs in which user 101 participates, such as a loyalty program associated with merchant 111).

Incentive data store 142 may include structured or unstructured data records that include elements of digital content that, when presented to user 101 by client device 102 within a corresponding digital interface, identify and provide an incentive for user 101 to initiate an additional purchase transaction with one or more merchants, such as, but not limited to, merchant 111. By way of example, the incentives associated with the elements of digital content may include, but are not limited to, a discount on an additional purchase of a product or service at merchant 111 or another merchant disposed proximate to (e.g., within a threshold distance of) a current geographic position of client device 102, a geographic position of a counterparty to an initiated purchase transaction (e.g., merchant 111), or a geographic position along expected route travelled by client device 102 during a particular temporal interval. In some instances, the structured or unstructured data records of incentive data store 142 may store each of the elements of digital content in conjunction with one or more elements of metadata that, among other things, identify a corresponding merchant associated with the incentive (e.g., a merchant name, etc.) or a corresponding geographical location associated with the incentive (e.g., a corresponding set of geo-spatial coordinates, a corresponding geographic region, a corresponding geographic identifier, etc.). Further, in some instances, the structured or unstructured data records of incentive data store 142 may store each of the elements of digital content in conjunction with one or more elements of layout data, which specify a disposition of the elements of digital content, or visual characteristics of the elements of digital content, when rendered for presentation within a corresponding digital interface by one or more application programs executed by client device 102.

Further, and to facilitate the performance of any of the exemplary processes described herein, FI computing system 130 may also maintain, within the one or more tangible, non-transitory memories, an application repository 144 that maintains, but is not limited to, a decomposition engine 146, an analytical engine 148, and a notification engine 150, each of which may be executed by the one or more processors of server 132.

For example, and upon execution by the one or more processors of FI computing system 130, executed decomposition engine 146 may perform any of the exemplary processes described herein to obtain field mapping data 138A from mapping data store 138, to apply field mapping data 138A to a received, obtained, or intercepted RFP message, and based on the application of field mapping data 130A to the RFP message, to decompose the RFP message and obtain elements of message data that not only identify and characterize each counterparty involved in an initiated purchase transaction (e.g., user 101 and merchant 111, described herein), but that also characterize the initiated purchase transaction. Further, and upon execution by the one or more processors of FI computing system 130, executed analytical engine 148 may perform any of the exemplary processes described herein to process the elements of message data obtained from the message fields of the RFP message, determine or infer a geographic position associated with merchant 111 and as such, with the initiated purchase transaction.

Upon execution by the one or more processors of FI computing system 130, notification engine 150 may perform any of the exemplary processes described herein to generate one or more elements of a payment notification that, when provisioned to client device 102 by FI computing system 130, cause one or more application programs executed by client device 102 to present interface elements within a corresponding digital interface that prompt user 101 to provide an approval of the real-time payment requested by merchant 111 via the RFP message, e.g., contemporaneously with the initiation of the purchase transaction. Further, in some examples, executed notification engine 150 may perform any of the exemplary processes described herein to identify one or more of the elements of digital content maintained within incentive data store 142 that are of potential relevance to the initiated purchase transaction, to merchant 111 or to user 101, and additionally, or alternatively, to the determined or inferred geographic position of merchant 111 in real time and contemporaneously with the initiation or execution of that purchase transaction. Executed notification engine 150 may perform further operations that package the identified elements of digital content into corresponding portions of the payment notification, and upon presentation within the digital interface by the one or more application programs executed by client device 102, the now-presented elements of digital content may incentivize user 101 to initiate another purchase transaction at merchant 111 (e.g., a "spur-of-the-moment" transaction) and additionally, or alternatively, a purchase transaction involving another merchant proximate to the determine determined or inferred geographic position of merchant 111 or along an expected route traversed by client device 102 during a particular temporal interval.

II. Computer-Implemented Processes for Determining Counterparty Location in Real-Time based on Structured Messaging Data In some instances, a customer of the financial institution, such as user 101, may elect to initiate a purchase of a product or service from a particular merchant, such as merchant 111, and may provide input to client device 102 (e.g., via input unit 109B) that triggers an execution of one or more locally maintained application programs associated with merchant 111, such as merchant application 106. By way of example, merchant 111 may correspond to a local coffee shop (e.g., "Barry's Coffee Shop") disposed proximate to a physical location of user 101's home in the Georgetown neighborhood of Washington, D.C., and upon execution by the one or more processors of client device 102, executed merchant application 106 may perform operations that present, via display unit 109A, a digital interface 200 that enables user 101 to select for purchase one or more products offered for sale by merchant 111 (e.g., coffee, pastries, etc.), and to submit payment for the products to merchant 111, prior to arriving at the local coffee shop and collecting the purchased products.

Figure 2A:
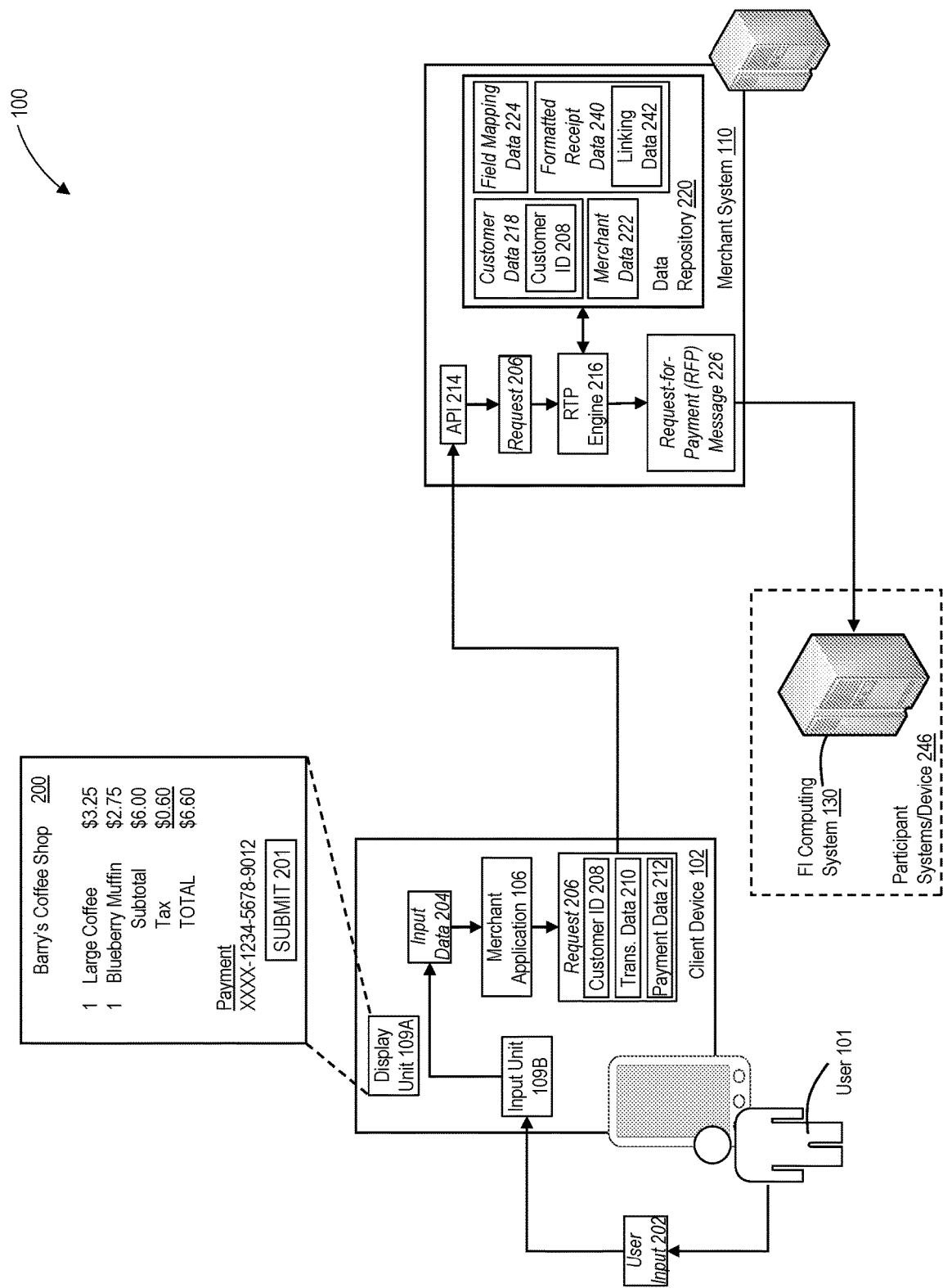
FIG. 2A is a block diagram illustrating a portion of an exemplary computing environment, in accordance with some exemplary embodiments.

Based on portions of digital interface 200, user 101 may provide input to input device 109B of client device 102 that specifies a selection of a large coffee and a blueberry muffin for purchase on a particular workday and that specifies a particular payment instrument available to fund the purchased coffee and blueberry muffin (e.g., a credit card account or deposit issued to user 101 by the financial institution, etc.). For example, as illustrated in FIG. 2A, digital interface 200 may include interface elements that specify the selection, by user 101, of the large coffee priced at $3.25 and a blueberry muffin priced at $2.75 for purchase on the particular workday, and that specify a pre-tax subtotal of $6.00 for the purchased coffee and blueberry muffin and an imposed sales tax of $0.60, and further, a total purchase price of $6.60. Further, the interface elements may also specify payment data that identifies the particular payment instrument available to fund the purchase transaction, such as an account number (e.g., "XXXX-1234-5678-9012"), an expiration date, and/or a card verification code. As illustrated in FIG. 2A, all or a selected portion of the payment data presented within digital interface 200 may be tokenized or otherwise obscured to, among other things, maintain a confidentiality of the presented elements of payment data.

Further, as illustrated in FIG. 2A, digital interface 200 may also include a selectable interface element, such as "SUBMIT" icon 201, that when selected by user 101, confirms an intention of user 101 to initiate the $6.60 purchase of the coffee and blueberry muffin involving the particular payment instrument, and requests a submission of corresponding elements of transaction and payment information to a computing system associated with merchant 111, e.g., merchant computing system 110. For example, input device 109B of client device 102 may receive additional input 202 indicative of a selection, by user 101, of SUBMIT icon 201, and may route, to executed merchant application 106, input data 204 that includes, but is not limited to, information specifying the purchased products, the subtotal, imposed sales tax, and total purchase price, and the particular payment instrument that funds the initiated purchase transaction.

In some instances, executed merchant application 106 package all, or a selected portion, of input data 204 into corresponding portions of a purchase request 206, and may perform operations that cause client device 102 to transmit purchase request 206 across network 120 to a computing system associated with merchant 111, such as merchant computing system 110. Further, although not illustrated in FIG. 2A, executed merchant application 106 may also perform operations that encrypt all, or a portion, of purchase request 206 using an appropriate encryption key (e.g., a public cryptographic key of merchant computing system 110, etc.) prior to transmission across network 120.

In some instances, purchase request 206 may include a customer identifier 208 associated with user 101 (e.g., an alphanumeric login credential that uniquely identifies user 101 at merchant computing system 110), elements of transaction data 210 that specify values of one or more parameters characterizing the initiated purchase transaction, and elements of payment data 212 that specify the particular payment instrument selected to fund the purchase transaction. For example, the elements of transaction data 210 may include an identifier of each of the purchased products (e.g., a universal product code (UPC) associated with the large coffee and the blueberry muffin, etc.), the subtotal for the purchase transaction (e.g., $6.00), the imposed sales tax (e.g., $0.60), the total purchase price (e.g., $6.60), and a time or date of the initiated purchase transaction (e.g., 9:30 a.m. on Dec. 1, 2020). Additionally, in some examples, the elements of payment data 212 may include, among other things, all or a selected portion of the account number (e.g., in tokenized form, etc.), the corresponding expiration data, and/or the corresponding card verification code.

A programmatic interface established and maintained by merchant computing system 110, such as application programming interface (API) 214, may receive purchase request 206 from client device 102, and may route purchase request 206 to a real-time payment (RTP) engine 216 executed by the one or more processors of merchant computing system 110. In some instances, as described herein, all, or a selected portion, of purchase request 206 may be encrypted, and executed RTP engine 216 may perform operations that decrypt the encrypted portions of purchase request 206 using a corresponding, and appropriate, decryption key, such as a private cryptographic key associated with merchant computing system 110. Executed RTP engine 216 may also perform operations that, based on portions of purchase request 206, verify that user 101 represents a registered customer of merchant 111. For example, executed RTP engine 216 may parse purchase request 206 and obtain customer identifier 208, which uniquely identifies user 101, and identify one or more elements of customer data associated with customer identifier 208 within a corresponding merchant data repository 220. The identified elements of customer data 208 may include, among other things, a full name of user 101 and a postal address of user 101, and based on the identification of the elements of customer data 208 and their association with customer identifier 208, executed RTP engine 216 may verify that user 101 represents a registered customer of merchant 111.

Executed RTP engine 216 may also extract, from merchant data repository 220, one or more elements of merchant data 222 and one or more elements of field mapping data 224. In some instances, the one or more elements of merchant data 222 may include, but are not limited to, an identifier of merchant 111 (e.g., a merchant name, such as "Barry's Coffee Shop"), a postal address associated with merchant 111 (e.g., an actual postal address, a generic postal address, etc.), and information that identifies a financial services account associated with merchant 111 and capable of receiving proceeds from one or more of the purchased transactions described herein (e.g., an account number, a routing number, etc.). Further, the one or more elements of field mapping data 224 may characterize a structure, composition, or format of one or more data fields of an ISO-20002-compliant RFP message, such as those described herein, and additionally, or alternatively, an RFP message compliant with another standardized data-exchange protocol.

Executed RTP engine 216 may parse purchase request 206 and obtain the one or more elements of transaction data 210 that specify the parameter values characterizing the initiated purchase transaction, and elements of payment data 212 that specify the particular payment instrument selected to fund the initiated purchase transaction. In some instances, based on portions of the elements of transaction data 210, payment data 212, customer data 218, and merchant data 222, executed RTP engine 216 may perform any of the exemplary processes described herein to generate a request-for-payment (RFP) message 226 that is structured and formatted in accordance with the one or more elements of field mapping data 224 and that requests a payment from user 101 for the initiated purchase transaction (e.g., the $6.60 purchase of the large coffee and the blueberry muffin at 9:30 a.m. on December $1^{st}$) not at a close of a corresponding business or calendar day, but instead in real-time and contemporaneously with the initiation of the purchase transaction by client device 102. As described herein, RFP message 226 may be structured in accordance with the ISO 20022 standard for electronic data exchange between financial institutions, and in some examples, RFP message 226 may correspond to a pain.013 message as specified within the ISO 20022 standard. Further, and as described herein, the one or more elements of field mapping data 224 may characterize a structure, composition, or format of one or more data fields of ISO-20002-compliant RFP message 226 (e.g., the one or more data fields within the pain.013 message).

By way of example, ISO-20022-compliant RFP message 226 may include among other things: (i) message fields populated with data specifying a full name and postal address of user 101; (ii) message fields populated with data identifying a payment instrument selected by user 101 to fund the initiated purchase transaction; (iii) message fields populated with data specifying a name and postal address of merchant 111; (iv) message fields populated with data identifying a financial services account held by merchant 111 and available to receive processed from the requested payment; and (v) message fields populated with one or more parameter values that characterize the initiated purchase transaction, a requested payment method, and/or a requested payment date. Further, ISO-20022-compliant RFP message 226 may also include one or more structured or unstructured message fields that specify additional information associated with the initiated purchase transaction.

Examples of the additional information include, but are not limited to, information identifying a product or service involved in the initiated purchase transaction, or a link to remittance data associated with the initiated transaction (e.g., a link to a PDF or HTML invoice identifying the merchant/vendor, the geographic location of the merchant/vendor, or the purchased product or service). In some instances, as described herein, the link may include a long-form uniform resource locator (URL) into which certain elements of positional or customer data may be embedded, such as, but not limited to, the actual postal code of merchant 111 or the unique identifier of user 101. In other instances, the link may include a shortened URL, such as a tiny URL, actionable by FI computing system 130 using any of the exemplary processes described herein.

In some instances, executed RTP engine 216 may parse the elements of transaction data 210, payment data 212, customer data 218, and merchant data 222, and may perform that populate the message fields of RFP message 226 with corresponding elements of elements of transaction data 210, payment data 212, customer data 218, and merchant data 222 in accordance with field mapping data 224. For example, executed RTP engine 216 may parse transaction data 210 and obtain data that specifies a requested payment date (e.g., Dec. 1, 2020), a requested payment amount (e.g., the $6.60 total purchase price), and a currency associated with that requested payment amount (e.g., U.S. dollars). Executed RTP engine 226 may also format the requested payment data, the requested payment amount, and the requested payment current in accordance with portions pf field mapping data 224. As illustrated in FIG. 2B, executed RTP engine 216 may perform operations that populate message field 228 of RFP message 226 with the formatted payment date (e.g., "2020-12-01") and message fields 230 of RFP message 226 with respective ones of the formatted payment amount (e.g., "6.60") and formatted payment current (e.g., "USD").

Further, executed RTP engine 216 may parse the elements of customer data 218 to obtain a name of user 101 (e.g., "John Q. Stone") and a postal address associated with user 101 (e.g., "2223 Eye Street NW, Washington, D.C., 20037, US"), and may parse the elements of payment data 212 to obtain information that identifies (e.g., an "identification" of) the payment instrument selected by user 101 to fund the purchase transaction (e.g., the account number "XXXX-1234-5678-9012"). In some instances, executed RTP engine 216 may format the obtained customer name, the obtained customer address, and the obtained identification of the payment instrument in accordance with portions of field mapping data 224, and as illustrated in FIG. 2B, executed RTP engine 216 may perform operations that populate message fields 232 of RFP message 226 with respective portions of the formatted customer name and customer address, and that populate message field 234 with the formatted identification of the selected payment instrument.

Executed RTP engine 216 may also parse the elements of merchant data 222 to obtain a name of merchant 111 (e.g., "Barry's Coffee Shop"), a postal address associated with merchant 111 (e.g., "3301 M Street NW, Washington, D.C., 20007, US"), and that identifies (e.g., an "identification" of) a financial services account associated with merchant 111 and capable of receiving proceeds from one or more of the purchased transactions (e.g., the account number "XXXX-9012-3456-7890"). In some instances, executed RTP engine 216 may format the obtained merchant name, the obtained merchant address, and the obtained identification of the merchant account in accordance with portions of field mapping data 224, and as illustrated in FIG. 2B, executed RTP engine 216 may perform operations that populate message fields 236 of RFP message 226 with respective portions of the formatted merchant name and merchant address, and that populate message field 238 with the formatted identification of the merchant account.

Further, and as described herein, RFP message 226 may also include one or more message fields that specify remittance information associated with the initiated purchase transaction, such as, but not limited to, a link to a PDF or HTML invoice identifying merchant 111, a postal address associated with merchant 111, or the purchased products or services. For example, and upon receipt of purchase request 206, merchant computing system 110 (e.g., via executed RTP engine 216 or one or more other executed application programs, engines, or modules) may generate one or more elements of formatted receipt data 240 that identify merchant 111 (e.g., "Barry's Coffee Shop"), a postal address associated with merchant 111 (e.g., "3301 M Street NW, Washington, D.C., 20007, US"), and one or more elements of transaction data 210 (e.g., names and/or UPCs of the purchased large coffee and blueberry muffin, the $6.00 subtotal of the purchase transaction, the $0.60 sales tax, the $6.60 total purchase amount, etc.) or payment data 212 (e.g., a tokened portion of the account number of the selected payment instrument, etc.). In some instances, merchant computing system 110 may perform operations that store the elements of formatted receipt data 240 within a portion of data repository 220, along with corresponding elements of linking data 242 that include, among other things, a long-form or shortened URL associated with the stored elements of formatted receipt data 240 (e.g., that point to the storage location of formatted receipt data 240 within data repository 220).

In some instances, executed RFP engine 216 may perform operations that obtain linking data 242 from data repository 220, and that process and package all, or a selected portion, of linking data 242 within a corresponding unstructured message field of RFP message 226. For example, linking data 242 may include a long-form URL that points to formatted receipt data 240 maintained within data repository 220 and includes the actual postal code of merchant 111 (e.g., "20007") and the customer identifier of user 101 (e.g., http://www.BarrysCoffeeShop.com/receipt?custid='1234'?zip='20007'), and as illustrated in FIG. 2B, executed RFP engine 216 may parse linking data 242, obtain the long-form URL, and package the long-form URL into an unstructured message field 244 of RFP message 226. The disclosed embodiments are, however, not limited to RFP messages populated with these exemplary elements of customer, merchant, payment, transaction, and additional remittance data, and in other examples, RFP message 226 may include any additional, or alternate, message fields specified within field mapping data 224 and consistent with the ISO 20022 standard for electronic data exchange, and executed RFP engine 216 may populate these message fields with any additional, or alternate, structured and formatted elements of customer, merchant, payment, transaction, or additional remittance data appropriate to RFP message 226 and field mapping data 224.

As illustrated in FIG. 2A, executed RFP engine 216 may perform operations that cause merchant computing system 110 to broadcast now-populated RFP message 226 across network 120 to one or more computing systems or devices 246 within environment 100 that are associated with participants in the RTP ecosystem, such as, but not limited to, FI computing system 130 or client device 102. In some instances, and prior to broadcasting now-populated RFP message 226 across network 120, executed RFP engine 216 may perform operations that encrypt RFP message 226 using a corresponding encryption key, and examples of the corresponding encryption key include, but are not limited to, a public cryptographic key associated with FI computing system 130.

Figure 3A:
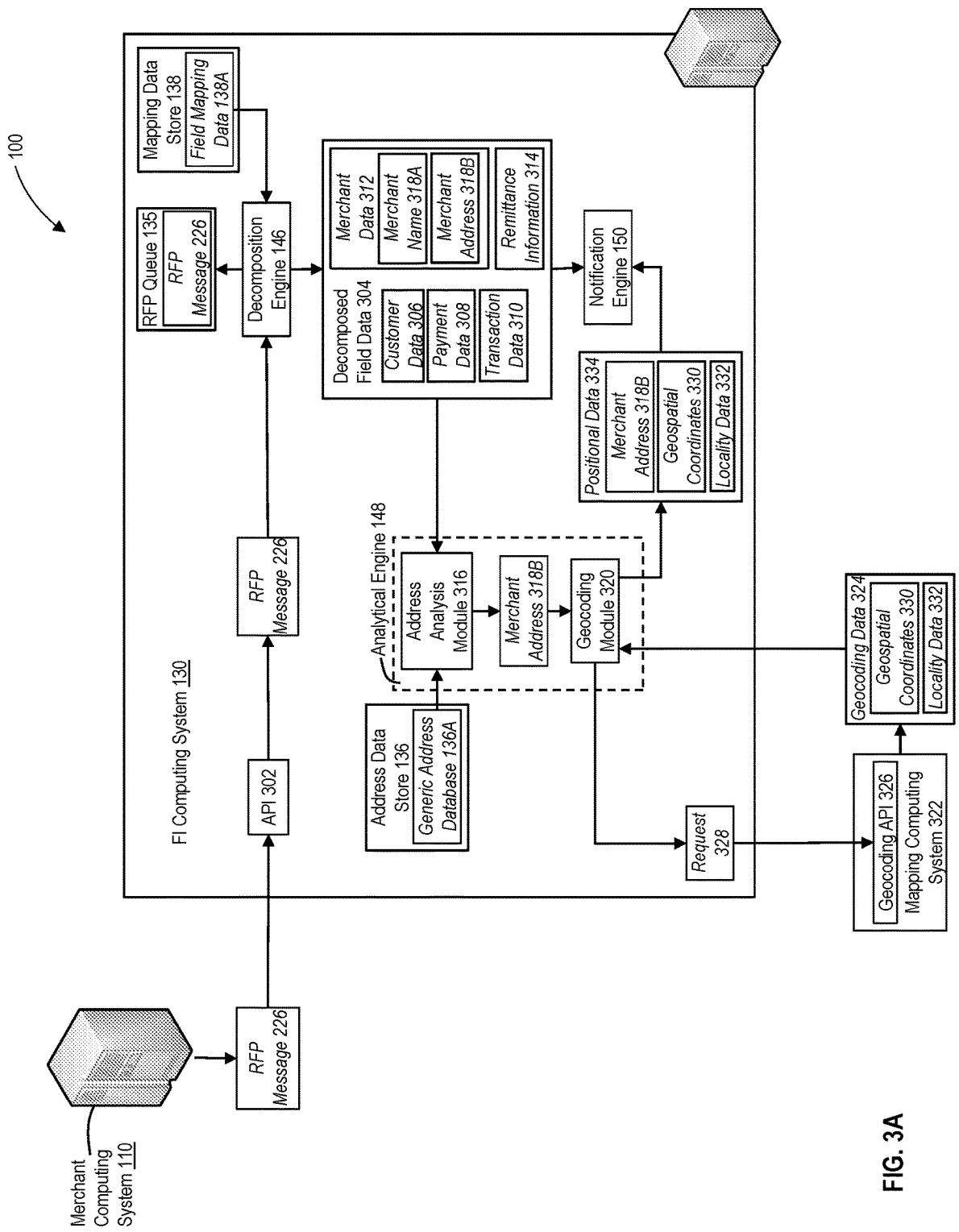
FIGS. 3A, 3B, and 3C, and FIGS. 4A and 4B, are block diagrams illustrating portions of an exemplary computing environment, in accordance with some exemplary embodiments.

Referring to FIG. 3A, a programmatic interface established and maintained by FI computing system 130, such as application programming interface (API) 302, may receive RFP message 226, and may route RFP message 226 to decomposition engine 146, which may be executed by the one or more processors of FI computing system 130. In some examples, FI computing system 130 may receive RFP message 226 directly across network 120 via a channel of communications established programmatically between API 302 and executed RFP engine 216 of merchant computing system 110. In other examples, FI computing system 130 may receive RFP message 226 across network 120 from one or more of computing systems or devices 246 associated with the participants in the RTP ecosystem. Further, and as described herein, one or more portions of RFP message 226 may be encrypted (e.g., using a public cryptographic key associated with FI computing system 130), and executed decomposition engine 146 may perform operations that access a corresponding decryption key maintaining within the one or more tangible, non-transitory memories of FI computing system 130 (e.g., a private cryptographic key associated with FI computing system 130), and that decrypt the encrypted portions of RFP message 226 using the corresponding decryption key.

In some instances, executed decomposition engine 146 may store RFP message 226 (in decrypted form) within a corresponding portion of data repository 134, e.g., within RFP queue 135. Executed decomposition engine 146 may also perform operations that access mapping data store 138 (e.g., as maintained within data repository 134), and obtain one or more elements of fields mapping data 138A that characterize a structure, composition, or format of one or more data fields of RFP message 226. For example, and as described herein, RFP message 226 may include message fields consistent with the ISO 20022 standard for electronic data exchange between financial institutions, and each of the message fields may be populated with data structured and formatted in accordance with the ISO 20022 standard.

As described herein, RFP message 226 may be associated with a real-time payment of $6.60 requested from user 101 by merchant 111 for the large coffee and blueberry muffin purchased on Dec. 1, 2020. By way of example, RFP message 226 may include, but is not limited to, a message field populated with data specifying the requested payment date of December $1^{st}$ (e.g., message field 228 of FIG. 2B) and message fields populated within data specifying the requested payment amount of US $6.60 (e.g., message fields 230 of FIG. 2B). RFP message 226 may also include, but is not limited to, message fields populated with data that identify and characterize user 101 (e.g., message fields 232 of FIG. 2B) and merchant 111 (e.g., message fields 236 of FIG. 2B), along with additional message fields populated with data that identify the payment instrument selected by user 101 to fund the purchase transaction (e.g., message field 234 of FIG. 2B) and the financial services account associated with merchant 111 and capable of receiving proceeds from the purchase transaction (e.g., message field 238 of FIG. 2B). Further, and as described herein, RFP message 226 may include one or more additional data fields populated with structured or unstructured remittance data, such as, but not limited to, a long-form URL that points to formatted receipt data 240 maintained within data repository 220 (e.g., message field 244 of FIG. 2B, which may include http://BarrysCoffeeShop.com/ receipt?custid='1234'?zip='20007'). The disclosed embodiments are, however, not limited to structured or unstructured remittance data that includes a long-form URL, and in other instances, the structured or unstructured remittance data may include one or more identifiers (e.g., UPCs, etc.) of the purchased products or a shortened URL that points to formatted receipt data 240.

Based on the obtained elements of field mapping data 138A, executed decomposition engine 146 may perform operations that parse RFP message 226 and obtain elements of decomposed field data 304 that identify and characterize user 101, merchant 111, and the requested payment for the purchase transaction initiated on Dec. 1, 2020. In some instances, and through the performance of these exemplary operations, executed decomposition engine 146 may "decompose" the structured or unstructured data populating the message fields of RFP message 226 in accordance with field mapping data 138A, and generate the elements of decomposed field data 304 that include, but is not limited to, elements of customer data 306, payment data 308, transaction data 310, and merchant data 312.

By way of example, and based on the elements of field mapping data 138A, executed decomposition engine 146 may determine that message fields 232 of RFP message 226 include data that identifies and characterizes user 101, and may perform operations that obtain, from message fields 232, a customer name of user 101 (e.g., "John Q. Stone") and a customer address of user 101 (e.g., "2220 Eye Street NW, Washington, D.C., 20037, US"). Further, as illustrated in FIG. 3A. executed decomposition engine 146 may package the obtained customer name and address into corresponding portions of customer data 306.

Further, based on the elements of field mapping data 138A, executed decomposition engine 146 may determine that message fields 228 and 234 of RFP message 226 include data identifying respective ones of the requested payment date and the payment instrument selected by user 101 to fund the purchase transaction. In some instances, executed decomposition engine 146 may perform operations that obtain, from respective ones of message fields from message fields 228 and 234, the requested payment date of Dec. 1, 2020 and the information that identifies the selected payment instrument (e.g., the account number "XXXX-1234-5678-9012"), which executed decomposition engine 146 may package into corresponding portions of payment data 308. Executed decomposition engine 146 may also determine, based on the elements of field mapping data 138A, that message fields 230 of RFP message 226 include data identifying the requested payment amount and the currency associated with that requested payment amount. In some instances, executed RTP engine 216 may perform operations that obtain, from respective ones of message fields 230, data that identifies the $6.60 requested payment amount and the requested denomination in U.S. currency, and package the obtained data within corresponding portions of transaction data 310.

In some instances, and based on the elements of field mapping data 138A, executed decomposition engine 146 may determine that message fields 236 and 238 include data that identifies and characterizes merchant 111, that identifies the financial services account associated with merchant 111 and capable of receiving proceeds from the purchase transaction. Executed decomposition engine 146 may perform operations that obtain, from message fields 236, a name of merchant 111 (e.g., "Barry's Coffee Shop") and a postal address associated with merchant 111 (e.g., "3301 M Street NW, Washington, D.C., 20007, US"), and that obtain, from message field 238, the information identifying the financial services account associated with merchant 111 (e.g., the account number "XXXX-9012-3456-7890" of the merchant account). Further, executed decomposition engine 146 may perform additional operations that package the obtained merchant name, the obtained merchant address, and the obtained information identifying the merchant account into corresponding portions of merchant data 312.

Additionally, and as described herein, executed decomposition engine 146 may also determine, based on the elements of field mapping data 138A, that message field 244 of RFP message 226 includes structured or unstructured elements of remittance data that characterizes further the initiated purchase transaction, user 101, or merchant 111, and executed decomposition engine 146 may obtain the structured or unstructured elements remittance data from message field 244 and package the obtained elements of remittance data into corresponding portions of remittance information 314. For example, the elements of structured or unstructured remittance data may include the long-form URL that points to formatted receipt data 240 maintained within data repository 220 and that includes the actual postal code of merchant 111 (e.g., "20007"), and executed decomposition engine 146 may obtain the long-form URL from message field 244 of RFP message 226, and package that long-form URL into remittance information 314.

The disclosed embodiments are, however, not limited to elements of structured or unstructured remittance data that include a long-form URL pointing to formatted receipt data maintained at merchant computing system 100. In other instances, the structured or unstructured remittance data maintained within message field 244 of RFP message 226 (or within additional, or alternate, message fields of RFP message data 226) may include an additional, or alternate, long-form URL pointing to formatted receipt data maintained at merchant computing system 111 or at other computing systems within environment 100, a shortened URL (e.g., a tiny URL) actionable by FI computing system 130 and pointing to formatted receipt data maintained at merchant computing system 111 or at other computing systems within environment 100, or other elements of data that identify or characterize user 101, merchant 111, or the purchase transaction, such as UPCs of the large coffee or blueberry muffin.

In some instances, executed decomposition engine 146 may perform operations that store decomposed field data 304, which includes the element of customer data 306, payment data 308, transaction data 310, merchant data 312, and remittance information 314, within a corresponding portion of data repository 134 (not illustrated in FIG. 1), and may provide decomposed field data 304 as an input to analytical engine 148 of FI computing system 130. Upon execution by the one or more processors of FI computing system 130, executed analytical engine 148 may perform any of the exemplary processes described herein to determine or infer an postal address associated with an actual, physical location of merchant 111 (e.g., the actual post address from which user 101 collects the purchase large coffee and blueberry muffin) based on portions of decomposed field data 304, wither along or in conjunction with additional data associated with user 101, client device 102, or previously initiated transactions involving user 101 and client device.

For example, as illustrated in FIG. 3A, an address analysis module 316 of executed analytical engine 148 may perform operations that access merchant data 312 within decomposed field data 304, and obtain a corresponding merchant name 318A (e.g., "Barry's Coffee Shop") and postal address 318B (e.g., "3301 M Street NW, Washington, D.C., 20007, US"). Further, executed address analysis module 316 may also perform operations that access generic address database 136A maintained within address data store 136 of data repository 134. As described herein, the structured or unstructured data records of generic address database 136A may include, for each of a plurality of potential counterparties to purchase transactions involving user 101, an identifier of the potential counterparty (e.g., a merchant name) and all, or a selected portion, of a generic postal address associated with that potential counterparty. The generic postal address for each of the potential counterparties may, in some instances, represent a postal address associated with a corporate parent of the potential counterparty or a postal address associated with a franchisee of the corporate parent, and not an actual postal address from which user 101 may collect one or more purchased products or obtain one or more purchased services.

Executed address analysis module 316 may also perform operations that determine whether one or more of the structured or unstructured data records of generic address database 136A include merchant name 318A of merchant 111 (e.g., "Barry's Coffee Shop") and further, postal address 318B of merchant 111 (e.g., "3301 M Street NW, Washington, D.C., 20007, US"). By way of example, executed address analysis module 316 may parse the structured or unstructured data records of generic address database 136A to identify one or more data records that include merchant name 318A, and further may determine whether any of the identified data records include all, or a threshold portion, of merchant address 318B. The threshold portion of merchant address 318B may include a corresponding building number and street name (e.g., "3301 M Street NW"), a corresponding city and state (e.g., "Washington, D.C."), and a corresponding zip code (e.g., "20037"), but may exclude a corresponding unit number or a corresponding country, and in some instances, the threshold portion of merchant address 318B may include information appropriate to distinguish merchant address 318B from similar, generic postal addresses maintained within generic address database 136A.

For example, if executed address analysis module 316 were unable to identify any of the structured or unstructured data records of generic address database 136A that include merchant name 318A, or alternatively, if executed address analysis module 316 were to determine that none of the identified data records within generic address database 136A that include merchant name 318A also include at least the threshold portion of merchant address 318B, executed address analysis module 316 may determine that merchant address 318B (e.g., "3301 M Street NW, Washington, D.C., 20007, US") represents an actual, physical address of merchant 111 (e.g., "Barry's Coffee Shop") from which user 101 may collect the purchased large coffee and blueberry muffin Further, and based on the determination that merchant address 318B represents the actual, physical address of merchant 111, executed address analysis module 316 may establish that merchant address 318B represents an intended geographic position for user 101 during a particular temporal interval, e.g., to facilitate the selection and provisioning of targeted digital content and incentives to client device 102.

Responsive to the determination that merchant address 318B represents the actual, physical address of merchant 111, executed address analysis module 316 may provide merchant address 318B as an input to a geocoding module 320 of executed analytical engine 148. In some instances, upon execution by the one or more processors of FI computing system 130, executed geocoding module 320 may perform operations that obtain, from one or more computing systems operating within environment 100 (such as, but not limited to, a mapping computing system 322), elements of geocoding data 324 specifying geospatial coordinates associated with merchant address 318B and additionally, or alternatively, one or more administrative areas, localities, or neighborhoods that are associated with, and that include, merchant address 318B.

As illustrated in FIG. 3A, mapping computing system 322 may establish, and maintains, a corresponding programmatic interface, such as a geocoding application programming interface (API) 326. Executed geocoding module 320 may, for example, perform operations that establish a programmatic channel of communications across network 120 with geocoding API 326, and that package portions of merchant address 318B into corresponding portions of a request 328 for geocoding data 324, which FI computing system 130 may transmit across network 120 to mapping computing system 322. In some instances, a composition and structure of formatted request 328 may be consistent with a predetermined composition and structure associated with, and specified by, geocoding API 326 (e.g., as a Hypertext Transfer Protocol (HTTP) request), and mapping computing system 322 and geocoding API 326 may be associated with a corresponding, third-party mapping or geocoding platform, such as, but not limited to, Google Maps™ or Mapbox™

Geocoding API 326 may receive formatted request 328, and may perform operations that validate a structure or a composition of formatted request 328 (e.g., to establish a consistency between the structure or the composition of formatted request 328 and the predetermined structure or composition associated with geocoding API 326). Based on a successful validation of the structure or composition of formatted request 328, mapping computing system 322 may perform operations that parse formatted request 328 and obtain the portions of merchant address 318B, and that map the portions of merchant address 318B to a corresponding set of geospatial coordinates 330 (e.g., latitude, longitude, or altitude associated with the merchant address 318B, etc.) and to corresponding elements of locality data 332 (e.g., that identify one or more administrative areas, localities, or neighborhoods that are associated with, and that include, merchant address 318B). Mapping computing system 322 may package the set of geospatial coordinates 330 and the elements of locality data 332 into corresponding portions of geocoding data 324, and mapping computing system 322 may transmit geocoding data 324 across network 120 to FI computing system 130.

By way of example, the portions of merchant address 318B included within formatted request 328 may specify the actual, physical address of Barry's Coffee Shop (e.g., merchant 111) at 3301 M Street NW, Washington, D.C., 20007. Based on the portions of merchant address 318B, mapping computing system 322 may perform operations that map the actual, physical address of 3301 M Street NW, Washington, D.C., 20007, to geospatial coordinates 330 that include 38.905 N latitude and 77.067 W longitude. Further, mapping computing system 322 may generate elements of locality data 332 that specify a disposition of the actual, physical address of 3301 M Street NW, Washington, D.C., 20007, within the "Georgetown" neighborhood of Washington, D.C. As illustrated in FIG. 3A, mapping computing system 322 may package geospatial coordinates 330 (e.g., 38.905 N latitude and 77.067 W longitude) and the elements of locality data 332 (e.g., identifying the Georgetown neighborhood of Washington, D.C.) into corresponding portions of geocoding data 324.

In some instances, executed analytical engine 148 may receive geocoding data 324 from mapping computing system 322 (e.g., via a corresponding programmatic interface, such as an API), and executed geocoding module 320 may perform operations that process geocoding data 324 and that package geospatial coordinates 330 and locality data 332 into corresponding elements of positional data 334 (either alone, or in conjunction with merchant address 318B). As illustrated in FIG. 3A, executed geocoding module 320 may provide positional data 334 as an input to executed notification engine 150, which may perform any of the exemplary processes described herein to generate one or more elements of a payment notification associated with queued RFP message 226, to identify one or more of the elements of digital content that are of potential relevance to the initiated purchase transaction, to merchant 111 or to user 101, and additionally, or alternatively, to the determined or inferred geographic position of merchant 111 (e.g., as specified within positional data 334), and to provision the payment notification and the identified elements of digital content to client device 102 in real time and contemporaneously with the initiation or execution of that purchase transaction.

In some instances, as described herein, executed address analysis module 316 may establish that the postal address specified within merchant address 318B corresponds to an actual, physical address of merchant 111 (e.g., Barry's Coffee Shop) from which user 101 may collect the purchased large coffee and blueberry muffin. In other instances, executed address analysis module 316 may determine that one or more of the structured or unstructured data records of generic address database 136A include at least the threshold portion of merchant address 318B and as such, executed address analysis module 316 may determination that merchant address 318B, as obtained from the message fields of RFP message 226, corresponds to a generic address associated with merchant 111, such as, but not limited to, an address associated with a corporate parent of merchant 111 or an address associated with a franchisee that operates merchant 111.

Based on the determination that merchant address 318B corresponds to the generic address postal address, executed analytical engine 148 (and FI computing system 130) may establish that merchant address 318B lacks relevance to either the actual, physical location of merchant 111 and to an intended or expected geographic position of client device 102 during a future temporal interval. In some examples, executed analytical engine 148 may perform any of the exemplary processes described herein to determine or infer the actual, physical location of merchant 111, and the intended or expected geographic position of client device 102, based portions of remittance information 314 of decomposed field data 304, and additionally, or alternatively, based on data characterizing prior purchase transactions involving user 101 or client device 102, or on a geographic position of client device 102 at, or temporally proximate to, the intuition of the purchase transaction.

Figure 3B:
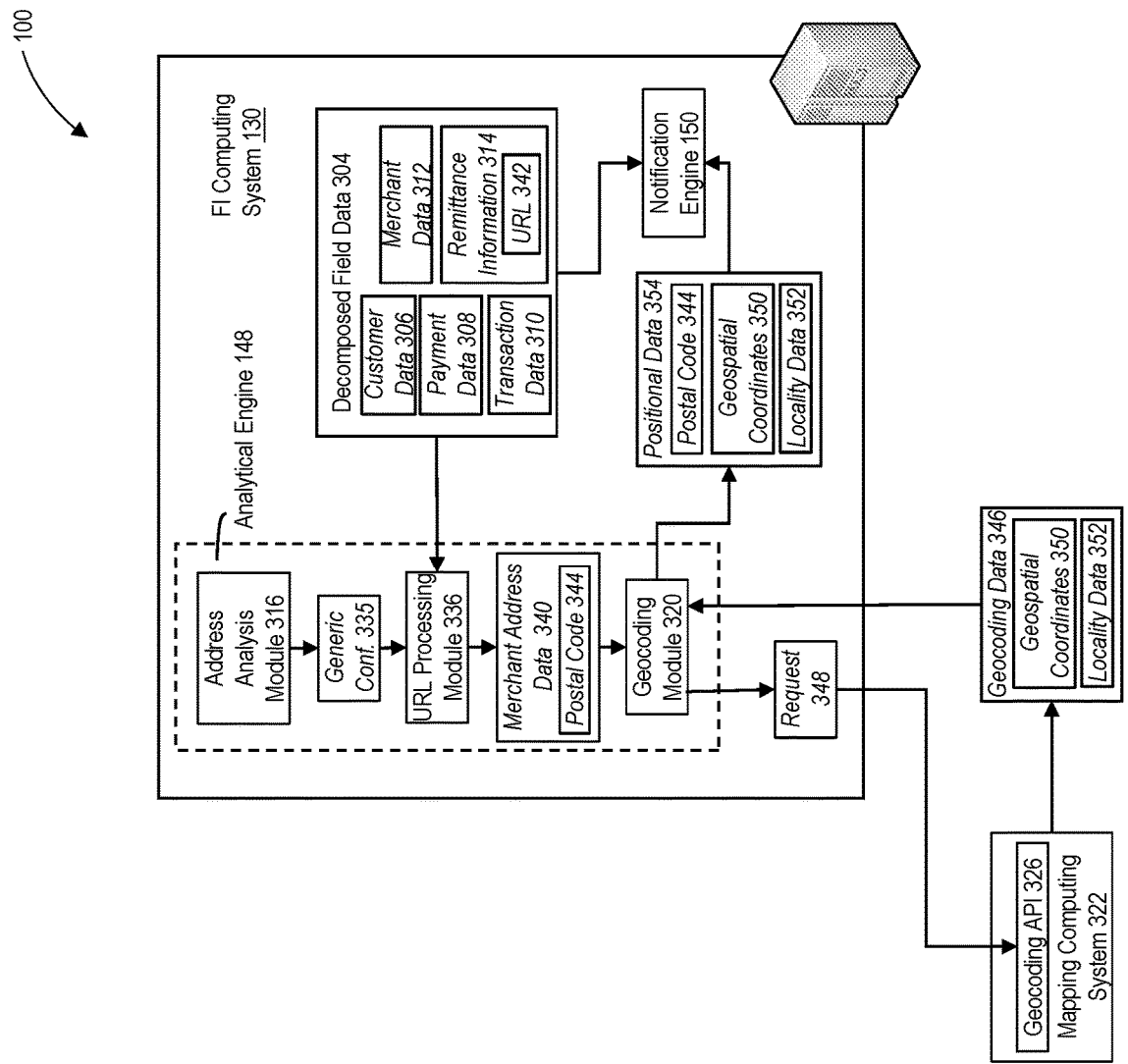

Referring to FIG. 3B, and responsive to the determination that merchant address 318B corresponds to the generic address, executed address analysis module 316 may generate data 335 confirming the generic character of merchant address 318B and provide data 335 as an input to a URL processing module 336 of executed analytical engine 148. In some instances, and upon execution by the one or more processors of FI computing system 130, executed URL processing module 336 may perform any of the exemplary processes described herein to obtain additional elements of merchant address data 340 based on any analysis of one or more URLs included within remittance information 314 of decomposed field data 304.

For example, remittance information 314 may include a URL 342 that points to elements of formatted receipt data 240 maintained within data repository 220 at merchant computing system 110. As described herein, URL 342 may correspond to a long-form URL, and one or more elements of positional data that characterize the actual, physical location of merchant 111 (e.g., from which user 101 may collect the purchased large coffee and blueberry muffin) may be embedded into URL 342. Examples of the positional data may include, but are not limited to, a portion of a postal address of the actual, physical location of merchant 111 (e.g., a portion of merchant address 318B, described herein) or a postal code of the actual, physical location of merchant 111. For instance, and as described herein, URL 342 may correspond to:

http://BarrysCoffeeShop.com/ receipt?custid='1234'?zip='20007', which includes the postal code of the actual, physical location of merchant 111 (e.g., postal code "20007" identified within URL 342 by a delimiter "zip") and an alphanumeric customer identifier of user 101 (e.g., customer identifier "1234" identified within URL 342 by a delimiter "custid"). The disclosed embodiments are, however, not limited to these examples of merchant positional or customer data, and in other instances, any additional or alternate elements of merchant positional data or customer data may be embedded into URL 342 and identified by corresponding, and appropriate, delimiters.

Executed URL processing module 336 may perform operations that parse long-form URL 342 and identify the postal code of the actual, physical location of merchant 111 (e.g., "20007") based on the corresponding delimiter (e.g., "zip"). Further, executed URL processing module 336 may perform further operations that obtain the postal code from URL 342, and that package the obtained postal code into the additional elements of merchant address data 340, e.g., as postal code 344. Executed URL processing module 336 provide merchant address data 340 as an input to executed geocoding module 320, which may perform any of the exemplary processes described herein to obtain, from mapping computing system 322, elements of geocoding data 346 specifying one or more geospatial coordinates associated with postal code 344 and additionally, or alternatively, one or more administrative areas, localities, or neighborhoods that are associated with, or that include, postal code 344.

As described herein, executed geocoding module 320 may perform operations that establish a programmatic channel of communications across network 120 with geocoding API 326, and that package portions of merchant address data 340, including postal code 344, into corresponding portions of a request 348 for geocoding data 346, which FI computing system 130 may transmit across network 120 to mapping computing system 322. In some instances, a composition and structure of formatted request 348 may be consistent with a predetermined composition and structure associated with, and specified by, geocoding API 326, e.g., as an HTTP request.

Geocoding API 326 may receive formatted request 348, and may perform any of the exemplary processes described herein to validate the structure or the composition of formatted request 348. Based on a successful validation of the structure or composition of formatted request 348, mapping computing system 322 may perform operations that parse formatted request 348 and obtain postal code 344, and that map postal code 344 (e.g., "20007") to a corresponding set of geospatial coordinates 350 (e.g., latitude, longitude, or altitude associated with the postal code 344, etc.) and to corresponding elements of locality data 352 (e.g., that identify one or more administrative areas, localities, or neighborhoods that are associated with, or that include, postal code 344). Mapping computing system 322 may package geospatial coordinates 350 and locality data 352 into corresponding portions of geocoding data 346, and mapping computing system 322 may transmit geocoding data 346 across network 120 to FI computing system 130.

By way of example, mapping computing system 322 may perform operations that map postal code 344 (e.g., postal code 20007 of the actual, physical location of merchant 111) to geospatial coordinates 350 that include 38.914 N latitude and 77.079 W longitude, and that generate elements of locality data 352 that associate postal code 344 (e.g., zip code "20007") with the Georgetown neighborhood of Washington, D.C. In some instances, geospatial coordinates 350 may correspond to, and may be associated with a geographic centroid of a corresponding geographic region associated with postal code 344, although in other instances, geospatial coordinates 350 may be associated with a postal address representative of postal code 344 (e.g., an address of a post office that services zip code 20007 within the Georgetown neighborhood of Washington, D.C.). As illustrated in FIG. 3B, mapping computing system 322 may package geospatial coordinates 350 (e.g., 38.914 N latitude, 77.079 W longitude) and the elements of locality data 352 (e.g., identifying the "Georgetown" neighborhood of Washington, D.C.) into corresponding portions of geocoding data 346.

Executed analytical engine 148 may receive geocoding data 346 from mapping computing system 322 (e.g., via the corresponding programmatic interface), and executed geocoding module 320 may perform operations that process geocoding data 346, which includes geospatial coordinates 350 and locality data 352, and that package geospatial coordinates 350 and locality data 352 into corresponding elements of positional data 354, along with postal code 344. As illustrated in FIG. 3B, executed geocoding module 320 may provide positional data 354 as an input to executed notification engine 150, which may perform any of the exemplary processes described herein to generate one or more elements of a payment notification associated with queued RFP message 226, to identify one or more of the elements of digital content that are of potential relevance to the initiated purchase transaction, to merchant 111 or to user 101, and additionally, or alternatively, to the determined or inferred geographic position of merchant 111 (e.g., as specified within positional data 354), and to provision the payment notification and the identified elements of digital content to client device 102 in real time and contemporaneously with the initiation or execution of that purchase transaction.

In some instances, described herein, URL 342 may include a long-form URL obtained from the message fields of RFP message 226, and executed URL processing module 336 may parse the long-for URL, and may perform any of the exemplary processes described herein to identify and obtain, from the long-form URL, one or more elements of data characterizing the actual, physical location of merchant 111, such as, but not limited to, postal code 344 (e.g., zip code "20007") associated with the physical location of merchant 111 within the Georgetown neighborhood of Washington, D.C. Further, and as described herein, URL 342 (e.g., the long-form URL described herein, or alternatively, a shortened or "tiny" URL) may point to, and be associated with, one or more formatted elements of formatted receipt data maintained at a corresponding computing system within environment 100, such as formatted receipt data 240 maintained within data repository 220 of merchant computing system 110. The elements of formatted receipt data 240 may, for example, be structured at as a document in PDF or HTML form, and elements of formatted receipt data 240 may identify merchant 111 (e.g., "Barry's Coffee Shop"), the postal address associated with the actual, physical location of merchant 111 (e.g., "3301 M Street NW, Washington, D.C., 20007, US"), and one or more elements of transaction data (e.g., names and/or UPCs of the purchased large coffee and blueberry muffin, the $6.00 subtotal of the purchase transaction, the $0.60 sales tax, the $6.60 total purchase amount, etc.) or payment data (e.g., a tokened portion of the account number of the selected payment instrument, etc.) that characterize the purchase transaction.

In additional, or alternate, instances, described below in reference to FIG. 3C, executed URL processing module 336 may perform operations that, based on URL 342, access and retrieve the elements of formatted receipt data 240 maintained at merchant computing system 110 within data repository 220. FI computing system 130 may also perform any of the exemplary processes described herein to process the retrieved elements of formatted receipt data 240, and to obtain additional merchant address data that includes all, or a selected portion, of the postal address of the actual, physical location of merchant 111 (e.g., from which user 101 may collect the purchased large coffee and blueberry muffin), and in some examples, elements of remittance data that characterize the purchase transaction of the purchased products or services (e.g., UPCs of the purchased large coffee and blueberry muffin). Based on the additional merchant address data, FI computing system 130 may perform any of the exemplary processes described herein to generate or obtain geospatial coordinates and/or locality data characterizing the actual, physical location of merchant 111, which may represent an intended or expected geographic position of user 101 and of client device 102 during a future temporal interval, e.g., to facilitate the selection and provisioning of targeted digital content and incentives to client device 102.

Figure 3C:
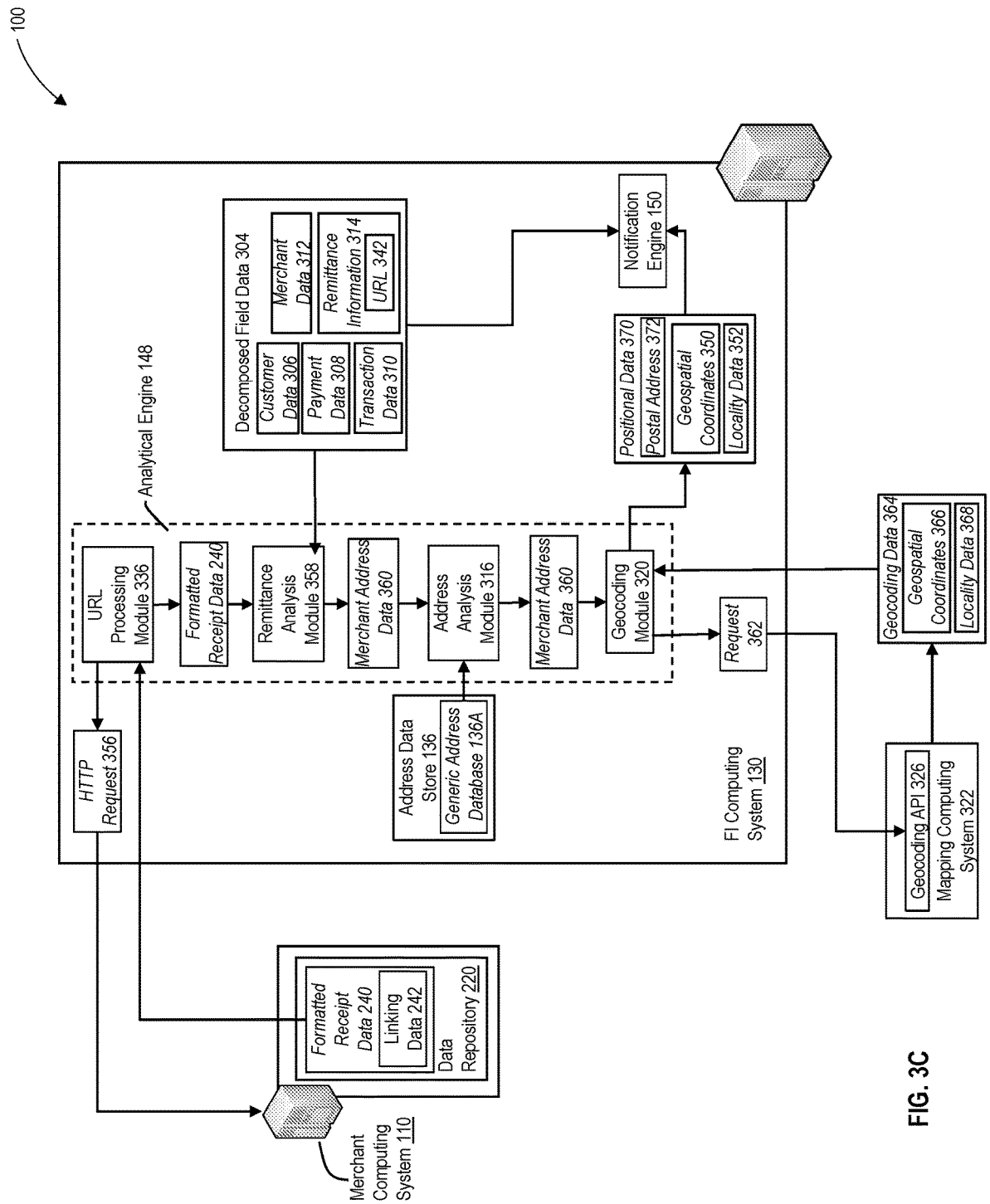

Referring to FIG. 3C, executed URL processing module 336 may access URL 342 (e.g., the long-form URL or the shortened URL described herein, etc.) maintained within remittance information 314 of decomposed field data 304 (e.g., in response to a receipt of data 335 described herein). In some instances, executed URL processing module 336 may process URL 342 and perform operations that programmatically access the elements of formatted receipt data 240 maintained within data repository 220 at merchant computing system 110. For example, to programmatically access the elements of formatted receipt data 240, executed URL processing module 336 may process URL 342, may generate a corresponding HTTP request for the elements of formatted receipt data 240, and may perform operations that cause FI computing system 130 to transmit HTTP request 356 across network 120 to merchant computing system 110. Merchant computing system 110 may, for example, receive HTTP request 356, and based on portions of HTTP request 356 and linking data 242 (e.g., a determined match or correspondence between the portions of HTTP request 356 and linking data 242), merchant computing system 110 may perform operations that extract the elements of formatted receipt data 240 from data repository 220, and that transmit the elements of formatted receipt data 240 across network 120 to FI computing system 130, e.g., as a response to HTTP request 356.

Executed URL processing module 336 may receive the elements of formatted receipt data 240 from merchant computing system 110, and may route the elements of formatted receipt data 240 to a remittance analysis module 358 of executed analytical engine 148. In some instances, and upon execution by the one or more processors of FI computing system 130, executed remittance analysis module 358 may perform any of the exemplary processes described herein to parse the elements of formatted receipt data 240 (e.g., in a received format, such as a PDF or HTML form, or in a transformed or enhanced format, etc.) and extract, from the parsed elements of formatted receipt data 240, portions of merchant address data 360 that identify or characterize portions of the postal address of the actual, physical location of merchant 111, e.g., from which user 101 may collect the purchased large coffee and blueberry muffin.

For example, the elements of formatted receipt data 240 may be structured in PDF form, and may include, among other things, merchant address data that include all, or a selected portion, of the postal address of the actual, physical location of merchant 111, and/or elements of remittance data that characterize the purchase transaction of the purchased products or services, such as UPCs of the purchased large coffee and blueberry muffin or values of transaction parameters that characterize the purchase transaction. In some instances, executed remittance analysis module 358 may apply one or more optical character recognition (OCR) processes or optical word recognition (OWR) processes to portions of the document in PDF form to generate elements of textual content representative of the merchant address data and the remittance data within the PDF document. Further, executed remittance analysis module 358 may perform operations that parse the generated elements of textual content an detect portions of the merchant address data and the remittance data within the generated elements of textual content.

In some instances, executed remittance analysis module 358 may perform operations that detect a presence, within the generated elements of textual content, of one or more keywords associated with discrete elements of the merchant data (e.g., "address," "postal code," etc.) or remittance data (e.g., "subtotal," "total," etc.), and extract elements of the textual content associated with these keywords as corresponding ones of the discrete elements of the merchant or remittance data. In other instances, executed remittance analysis module 358 may detect the portions of merchant address data and the remittance data within the generated elements of textual content based on an application of one or more adaptively trained machine learning or artificial intelligence models to portions of the textual content, and examples of these adaptively trained machine learning or artificial intelligence models includes a trained neural network process (e.g., a convolutional neural network process) that ingests input datasets composed of all, or selected portions, of the textual content.

Further, in some instances, the PDF document may be associated with document template data characterizing a disposition of elements of merchant address data and the remittance data within disposed portions of the PDF document, and executed remittance analysis module 358 may perform operations that detect and extract the elements of merchant address data and the remittance data from subsets of the generated textual content disposed within these discrete portions of the PDF document. The disclosed embodiments are, however, not limited to exemplary processes for detecting and extracting elements of merchant address or remittance data from the generated textual content, and in other instances, executed remittance analysis module 358 may perform any additional, or alternate, process for identifying one or more of the elements of merchant address data or remittance data from the elements of formatted receipt data 240 structured in PDF form.

In other examples, as described herein, formatted receipt data 240 may be structured in HTML form, and may include, among other things, the portion of a name of merchant 111 (e.g., "Barry's Coffee Shop"), portions of the postal address of merchant 111 (e.g., "3301 M Street NW, Washington, D.C., 20007, US"), and additionally, or alternatively, identifiers of the purchased products UPCs of the purchased large coffee and blueberry muffin. Formatted receipt data 240 may, for example, include additional information, such as elements of metadata, that identify and characterize one or more of the elements of merchant address data (the name of postal address of merchant 111, as described herein) or remittance data (e.g., the UPCs of the purchase products or the values of transaction parameters, as described herein), and executed remittance analysis module 358 may perform operations that detect one or more of the elements of metadata within formatted receipt data 240, and that obtain the corresponding elements of merchant address data or remittance data associated with these metadata elements from formatted receipt data 240. The disclosed embodiments are, however, not limited to these exemplary processes for detecting and extracting elements of merchant address or remittance data from HTML-formatted receipt data, and in other instances, executed remittance analysis module 358 may perform any additional, or alternate, process detecting and obtaining one or more of the elements of merchant address data or remittance data from formatted receipt data 240 structured in HTML form, including, but not limited to, an application of one or more screen-scraping processes to portions of formatted receipt data 240 structured in HTML form.

For instance, and using any of the exemplary process described herein, executed remittance analysis module 358 may detect the presence of the postal address of merchant 111 within formatted receipt data 240 (e.g., "3301 M Street N.W., Washington D.C. 20007 U.S.") and may obtain or extract the detected portal address from formatted receipt data 240. Executed remittance analysis module 358 may further package the postal address into a corresponding portion of merchant address data 360, which executed remittance analysis module 358 may provide as an input to executed address analysis module 316 of analytical engine 148. In some instances, executed address analysis module 316 may parse merchant address data 360 to obtain the postal address of merchant 111, and based on the structured or unstructured data records of generic address database 136A, executed address analysis module 316 may perform any of the exemplary processes described herein to determine that the postal address of merchant 111 (e.g., "3301 M Street N.W., Washington D.C. 20007 U.S."), as obtained or extracted from formatted receipt data 240, corresponds to a postal address of an actual, physical location of merchant 111 from which user 101 may collected the purchase large coffee and blueberry muffin, and not to a generic postal address associated with a corporate parent or franchise owner of merchant 111.

Responsive to a determination that the postal address extracted or obtained from formatted receipt data 240 corresponds to the actual, physical location of merchant 111, executed address analysis module 316 may provide merchant address data 360 as an input to executed geocoding module 320. As described herein, executed geocoding module 320 may perform operations that establish a programmatic channel of communications across network 120 with geocoding API 326 of mapping computing system 322, and that package portions of merchant address data 360 (e.g., the postal address of "3301 M Street N.W., Washington D.C. 20007 U.S." obtained or extracted from formatted receipt data 240) into corresponding portions of a request 362 for geocoding data 364, which FI computing system 130 may transmit across network 120 to mapping computing system 322. In some instances, a composition and structure of formatted request 362 may be consistent with a predetermined composition and structure associated with, and specified by, geocoding API 326, e.g., as an HTTP request.

Geocoding API 326 may receive formatted request 362, and may perform any of the exemplary processes described herein to validate the structure or the composition of formatted request 362. Based on a successful validation of the structure or composition of formatted request 362, mapping computing system 322 may perform operations that parse formatted request 362 and map the postal address of the actual, physical location of Barry's Coffee Shop (e.g., "3301 M Street NW, Washington, D.C., 20007") to a corresponding set of geospatial coordinates 366 (e.g., latitude, longitude, or altitude associated with the postal address, etc.) and to corresponding elements of locality data 368 (e.g., that identify one or more administrative areas, localities, or neighborhoods that are associated with, or that include, postal code 344). Mapping computing system 322 may package geospatial coordinates 366 and the elements of locality data 368 into corresponding portions of geocoding data 364, and mapping computing system 322 may transmit geocoding data 364 across network 120 to FI computing system 130.

By way of example, mapping computing system 322 may perform operations that map the postal address obtained or extracted from formatted receipt data 240 (e.g., the actual, physical location Barry's Coffee Shop at 3301 M Street NW, Washington, D.C., 20007) to geospatial coordinates 366 that include 38.905 N latitude and 77.067 W longitude, and that generate elements of locality data 368 that the actual, physical location of Barry's Coffee Shop with the "Georgetown" neighborhood of Washington, D.C. As illustrated in FIG. 3C, mapping computing system 322 may package geospatial coordinates 366 (e.g., 38.905 N latitude, 77.067 W longitude) and the elements of locality data 368 (e.g., identifying the "Georgetown" neighborhood of Washington, D.C.) into corresponding portions of geocoding data 364.

Executed analytical engine 148 may receive geocoding data 364 from mapping computing system 322 (e.g., via the corresponding programmatic interface), and executed geocoding module 320 may perform operations that process geocoding data 364, which includes geospatial coordinates 366 and locality data 368, and that package geospatial coordinates 366 and locality data 368 into corresponding elements of positional data 370, along with postal address 372 obtained or extracted from formatted receipt data 240 (e.g., the actual, physical location Barry's Coffee Shop at 3301 M Street NW, Washington, D.C., 20007). As illustrated in FIG. 3C, executed geocoding module 320 may provide positional data 370 as an input to executed notification engine 150, which may perform any of the exemplary processes described herein to generate one or more elements of a payment notification associated with queued RFP message 226, to identify one or more of the elements of digital content that are of potential relevance to the initiated purchase transaction, to merchant 111 or to user 101, and additionally, or alternatively, to the determined or inferred geographic position of merchant 111 (e.g., as specified within positional data 370), and to provision the payment notification and the identified elements of digital content to client device 102 in real time and contemporaneously with the initiation or execution of that purchase transaction.

In some instances, executed analytical engine 148 may perform any of the exemplary processes described herein to obtain portions of a postal address of an actual, physical location of merchant 111 (e.g., the actual, physical location Barry's Coffee Shop at 3301 M Street NW, Washington, D.C., 20007) directly from the structured message fields of RFP message 226 (e.g., from message fields 236 of RFP message 226). Further, executed analysis engine 148 may perform additional, or alternate, ones of the exemplary processes described herein to obtain portions of the postal address of the actual, physical location of merchant 111 from elements of merchant address data embedded into a long-form URL included within a structured or unstructured message field of RFP message 226 (e.g., within message field 244 of RFP message 226), or based on elements of formatted receipt or remittance data linked to a long-form or shortened URL included within a structured or unstructured message field of RFP message 226 (e.g., within message field 244 of RFP message 226).

In other instances, RFP message 226 may fail to include any merchant address data within corresponding structured message fields, or may fail to include any long-form or shortened URLs within corresponding structured or unstructured message fields (e.g., such data may be optional under the ISO 20022 standard for electronic data exchange between financial institutions) and additionally, or alternatively, executed analytical engine 148 may establish that the merchant address data obtained from RFP message 226 or from formatted receipt data 240 corresponds to a generic postal address associated with merchant 111, and not a postal address of an actual, physical location of merchant 111. In some instances, and in response to a determined absence of merchant address data or corresponding URLs within the message fields of RFP message 226, or on a generic nature of the obtained merchant address, executed analytical engine 148 may perform additional operations that generate positional data characterizing an actual, physical location of merchant 111 (e.g., the actual, physical location Barry's Coffee Shop at 3301 M Street NW, Washington, D.C., 20007) based on one or more elements of transaction data characterizing prior purchase transactions involving user 101 or based on one or more geographic positions of client device 102.

For example, executed analytical engine 148 may perform operations (not illustrated in FIG. 3A, 3B, or 3C) that access customer data store 140 (e.g., as maintained within data repository 134 at FI computing system 130), and obtain one or more elements of transaction data 140A that identify and characterize prior purchase transactions involving user 101 and initiated using any of the exemplary processes described herein. Each of the obtained elements of transaction data 140A may include, among other things, a prior transaction time and address data characterizing an actual, physical location of a corresponding merchant, and executed analytical engine 148 may perform any of the exemplary, RFP-based processes described herein to determine the prior transaction time and the positional data for each of the prior purchase transactions based on corresponding RFP messages.

In some instances, executed analytical engine 148 may access transaction 310 maintained within decomposed field data 304, and determine an initiated transaction time that characterizes the purchase transaction initiated by user 101 at Barry's Coffee Shop on Dec. 1, 2020. Based on corresponding ones of the prior transaction times, executed analytical engine 148 may determine that a subset of the obtained elements of transaction data 140A are associated with purchased transactions initiated by user 101 during a predetermined temporal interval prior to the initiated transaction time, such as, but not limited to, a fifteen-minute interval, a third-minute interval, a sixty-minute interval, or any additional, or alternate, prior temporal interval appropriate to RFP message 226 and to the obtained elements of transaction data 140A. Further, executed analytical engine 148 may also perform operations (not illustrated in FIGS. 3A, 3B, and 3C) that obtain the address data characterizing the prior purchase transactions from the determined subset of the elements of transaction data 140A, and based on the address data, establish that each of the prior purchase transactions, or a predetermined threshold number of the prior purchase transactions, are associated with a common postal address (e.g., an address of a shopping mall or shopping center) or a common postal code.

For example, executed analytical engine 148 may establish that user 101 initiated purchase transaction with Barry's Coffee Shop at 11:45 a.m. on Dec. 1, 2020 (e.g., based on transaction data 310), and during a prior, fifteen-minute interval, user 101 initiated three purchase transactions with merchants disposed physically within the "20007" postal code of Washington, D.C. (e.g., based on the subset of the elements of transaction data 140A). In some instances, based on the temporal proximity between the initiated purchase transaction with Barry's Coffee Shop and the prior, initiated purchase transactions with merchants disposed within postal code 20007, executed analytical engine 148 may determine, or infer, that merchant 111 (e.g., Barry's Coffee Shop) is also physically located within postal code 2007, and executed analytical engine 148 may perform any of the exemplary processes described herein (e.g., via executed geocoding module 320) to request and receive elements of geocoding data associated with the determined or inferred postal code (or alternatively, a determined or inferred portion of a postal address) associated with merchant 111.

In other instances, executed analytical engine 148 may perform operations (also not illustrated in FIGS. 3A, 3B, and 3C) that predict a postal code or locality (e.g., a neighborhood) that includes the physical location of merchant 111 based on the initiated transaction time of 11:45 a.m. and the prior transaction times and elements of address data associated with the subset of the elements of transaction data 140A. By way of example, and for each successive pair of prior purchase transactions associated with the subset of the elements of transaction data 140A, executed analytical engine 148 may compute a temporal difference in the transaction times, and based on portions of the corresponding elements of address data, compute a displacement between the physical locations of the corresponding merchants. Based on the computed displacements and the corresponding temporal differences, executed analytical engine 148 may perform operations that determine a speed at which user 101 travels between successive ones of the merchants associated with the prior transactions. Further, and based on the determined speeds and the physical location of the corresponding merchant associated with the most-recent of the prior purchase transactions, executed analytical engine 148 may compute a predicted location of, or geographic region associated with, the initiation of the purchase transaction at Barry's Coffee Shop at 11:45 a.m. on Dec. 1, 2020. Executed analytical engine 148 may perform any of the exemplary processes described herein (e.g., via executed geocoding module 320) to request and receive elements of geocoding data associated with the predicted geographic location or region associated with merchant 111.

In additional, or alternate instances, also not illustrated in FIG. 3A, 3B, or 3C, executed analytical engine 148 may perform operations that associate a geographic location of client device 102 at the initiated transaction time of 11:45 a.m. on Dec. 1, 2020, with the geographic location of merchant 111. For example, and as described herein, client device 102 may execute one or more application programs, such as mobile banking application 108, that transmit a geographic position of client device 102 (e.g., as determined by positional unit 109D coupled to processor 104) across network 120 to FI computing system 130 at predetermined intervals or in response to a request generated by FI computing system 130. FI computing system 130 may receive each of the transmitted geographic positions from client device 102, and may store each of geographic positions within customer data store 140 of data repository 134 along with a corresponding time stamp, e.g., which establish a records of a temporal evolution in the geographic positions of client device 102.

In some instances, executed analytical engine 148 may access customer data store 140, and obtain a corresponding one of the geographic positions of client device 102 that is associated with a time stamp equivalent to the initiated transaction time (e.g., 11:45 a.m. on Dec. 1, 2020) or that is disposed within a temporal interval that includes the initiated transaction time (e.g., a five-minute temporal interval, a fifteen-minute temporal interval, etc.). Executed analytical engine 148 may establish the obtained geographic position of client device 102 as the actual, physical position of merchant 111 (e.g., Barry's Coffee Shop), and may perform any of the exemplary processes described herein (e.g., via executed geocoding module 320) to request and receive elements of geocoding data associated with the established geographic position.

As described herein, executed analytical engine 148 generate one or more elements of positional data that identify and characterize an actual, physical location of merchant 111 involved in the initiated purchase transaction, such as one or more of positional data 334, 354, or 370 that identify geospatial coordinates and locality data associated with the actual, physical location of Barry's Coffee Shop within the Georgetown neighborhood of Washington, D.C. Executed analytical engine 148 may also provide the generated elements of positional data as inputs to notification engine 150 executed by the one or more processors of FI computing system 130. In some instances, executed notification engine 150 may perform any of the exemplary processes described herein to generate one or more elements of a payment notification associated with queued RFP message 226, to augment the payment notification with one or more elements of digital content that establish purchase incentives of potential relevance to the initiated purchase transaction, to merchant 111 or to user 101, and additionally, or alternatively, to the determined or inferred geographic position of merchant 111, and further to provision the payment notification and the identified elements of digital content to client device 102 in real time and contemporaneously with the initiation of the purchase transaction.

Figure 4A:
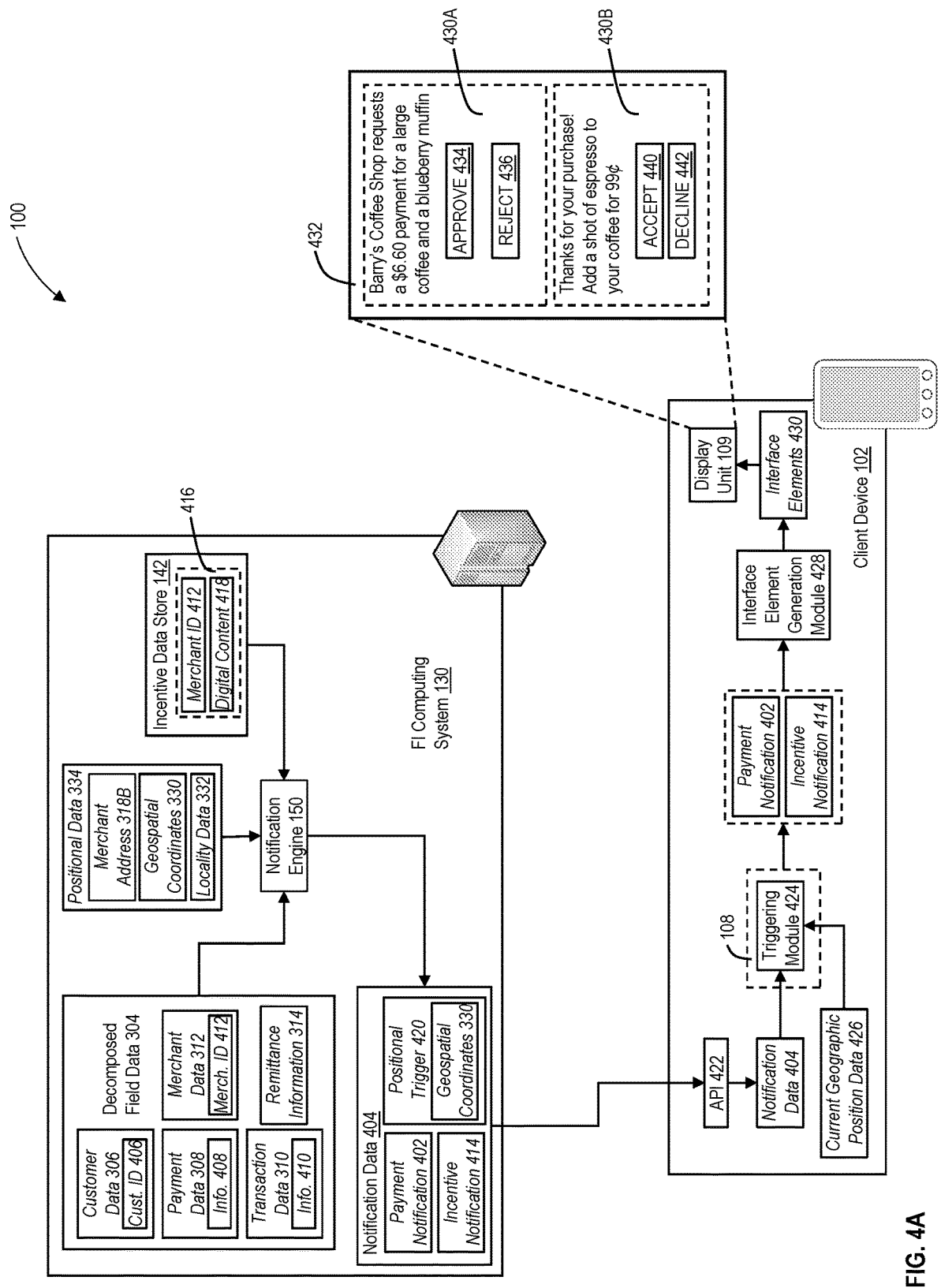

By way of example, and referring to FIG. 4A, executed notification engine 150 may receive positional data 334, which includes merchant data 318B specifying the postal address of the actual, physical location of merchant 111 (e.g., the physical location of Barry's Coffee Shop at 3301 M Street NW, Washington, D.C., 20007), geospatial coordinates 330 associated with that postal address (e.g., 38.905 N latitude, 77.067 W longitude), and elements of locality data 332 that indicate a disposition of merchant 111 within the Georgetown neighborhood of Washington, D.C. In other instances, not illustrated in FIG. 4A, executed notification engine 150 may receive, and process using any of the exemplary operations described herein, positional data 354, which includes postal code 344, geospatial coordinates 350, and locality data 352, or positional data 370, which includes postal address 372, geospatial coordinates 366, and locality data 368. Further, executed notification engine 150 may also perform operations that access data repository 134, and obtain decomposed field data 304 that includes one or more elements of customer data 306, payment data 308, transaction data 310, merchant data 312, and remittance information 314 extracted from the structured or unstructured message fields of RFP message 226 and as such, that identify and characterize the $6.60 payment requested from user 101 by merchant 111 (e.g., Barry's Coffee Shop) to fund the purchase of the large coffee and the blueberry muffin at 11:45 a.m. on Dec. 1, 2020.

In some instances, and based on portions of decomposed field data 304, executed notification engine 150 may perform operations that generate a payment notification 402 associated with the requested payment, and that generate notification data 404 that includes, among other things, payment notification 402. For example, executed notification engine 150 may parse customer data 306 within decomposed field data 304 to obtain a customer identifier 406 of user 101, such as, but not limited, a full name of user 101 extracted from message fields 232 of RFP message 226 (e.g., "John Q. Stone"). Further, executed notification engine 150 may also perform operations that parse payment data 308 to obtain payment information 408 that identifies the requested payment date of Dec. 1, 2020 (e.g., obtained from message field 228 of RFP message 226) and the payment instrument selected by user 101 to fund the purchase transaction (e.g., the account number "XXXX-1234-5678-9012" obtained from message field 234 of RFP message 226).

Executed notification engine 150 may also parse transaction data 310 to obtain information 410 that identifies the requested payment amount and payment currency of US $6.60 (e.g., obtained from message fields 230 of RFP message 226), and may parse merchant data 312 to obtain a merchant identifier 412 of merchant 111 (e.g., a merchant name "Barry's Coffee Shop" obtained from one or message fields 236 of RFP message 226). In some examples, executed notification engine 150 may perform operations that package all, or selected portion of, each of customer identifier 406, information 408 and 410, and merchant identifier 412 into corresponding portions of payment notification 402, which may be incorporated within notification data 404.

Further, executed notification engine 150 may perform any of the exemplary processes described herein to identify one or more elements of digital content maintained incentive data store 142 of data repository 134 that establish corresponding ones of a customer-, merchant-, transaction-, or location-specific purchase incentive, and to generate an incentive notification 414 that includes the one or more identified elements of digital content. In some instances, executed notification engine 150 may package incentive notification 414 into a corresponding portion of notification data 404, e.g., in conjunction with payment notification 402.

By way of example, executed notification engine 150 may parse the structured or unstructured data records of incentive data store 142 to identify one or more data records, such as data record 416, that includes or references merchant identifier 412 (e.g., the merchant name "Barry's Coffee Shop") and that includes one or more elements of digital content 418 that collectively establish a merchant-specific incentive associated with merchant 111. For example, the merchant-specific incentive established by elements of digital content 418 may, when presented within a portion of a digital interface by client device 102, offers user 101 a discount on a purchase of an additional product at Barry's Coffee Shop, such as an offer to add a shot of espresso to a purchased cup of coffee for an additional US 99¢. In other examples, the merchant-specific incentive established by the digital content 418 may, upon presentation within the portion of the digital interface, offer user 101 an opportunity to enroll in a loyalty program associated with Barry's Coffee Shop in exchange to a predetermined number of loyalty points. The disclosed embodiments are, however, not limited to these exemplary merchant-specific incentives, and in other instances, the structured or unstructured data records of incentive data store 142 may include elements of digital content that establish any additional, or alternate, merchant-specific incentive of relevance to user 101, merchant 111, or the purchase transaction initiated between user 101 and merchant 111.

In some instances, executed notification engine 150 may package the elements of digital content 418 (along with one or more elements of corresponding layout data, as described herein), which establish the merchant-specific incentive offered by Barry's Coffee Shop to user 101, within a corresponding portion of incentive notification 414. Executed notification engine 150 may also package incentive notification 414 within a corresponding portion of notification data 404. Further, executed notification engine 150 may also perform operations that generate a positional trigger 420 associated with payment notification 402 and incentive notification 414 (and the corresponding merchant-specific incentive), and to package positional trigger 420 into a corresponding portions of notification data 404, e.g., in conjunction with payment notification 402 and incentive notification 414. For example, positional trigger 420 may include geospatial coordinates 330 (e.g., 38.905 N latitude, 77.067 W longitude) of the actual, physical location of Barry's Coffee Shop at 3301 M Street NW, Washington, D.C., 20007.

Executed notification module 150 may perform additional operations that cause FI computing system 130 to transmit notification data 404 across network 120 to client device 102. In some instances, executed notification module 150 may also perform operations that trigger the transmission of notification data 404 based on a determination that a current geographic position of client device 102 (e.g., as established by positional unit 109D coupled to processor 104 of client device 102, and as provisioned to FI computing system 130 by executed mobile banking application 108 of client device 102) falls predetermined, threshold distance of geospatial coordinates 330. As described herein, one or more application programs executed by client device 102, such as mobile banking application 108, may cause client device 102 to generate, and present within the corresponding digital interface, one or more interface elements representative of payment notification 402 and incentive notification 414 based on, for example, a determination that the current geographic position of client device 102 (e.g., established by positional unit 109D coupled to processor 104) falls within the predetermined, threshold distance of geospatial coordinates 330 within positional trigger 420.

As illustrated in FIG. 4A, a programmatic interface associated with one or more application programs executed at client device 102, such as an application programming interface (API) 422 associated with mobile banking application 108, may receive notification data 404 and perform operations that cause client device 102 to executed mobile banking application 108 (e.g., through a generation of a programmatic command, etc.). Upon execution by the one or more processors of client device 102, executed mobile banking application 108 may receive notification data 404 from API 422, and a triggering module 424 of executed mobile banking application 108 may parse notification data 404 and obtain, from positional trigger 420, geospatial coordinates 330 of the actual, physical location of Barry's Coffee Shop at 3301 M Street NW, Washington, D.C., 20007 (e.g., 38.905 N latitude, 77.067 W longitude). Executed triggering module 424 may also obtain data 426 identifying a current geographic position of client device 102 (e.g., directly from provisional unit 109D or from a portion of memory 105), and may perform operations that compute a displacement between the geographic position specified by geospatial coordinates 330 (e.g., the actual, physical location of Barry's Coffee Shop at 3301 M Street NW, Washington, D.C., 20007) and the current geographic position of client device 102.

In some examples, executed triggering module 424 may determine that the computed displacement fails to exceed a predetermined threshold displacement, such as, but not limited to, a displacement of five meters, ten meters, fifty meters, or any additional, or alternate, displacement appropriate to merchant 111 and incentive notification 414. Based on the determination that the computed displacement fails to exceed a predetermined threshold displacement, executed triggering module 424 may establish that client device 102 is disposed within the predetermined threshold displacement of the actual, physical location Barry's Coffee Shop in the Georgetown neighborhood of Washington, D.C., and as such, is proximate to the actual, physical location Barry's Coffee Shop, and executed triggering module 424 may provide payment notification 402 and incentive notification 414 as input to an interface element generation module 428 of executed mobile banking application 108. In other examples, not illustrated in FIG. 4A, executed triggering module 424 may determine that the computed displacement exceeds the predetermined threshold displacement, and based on the determination that the computed displacement exceeds the predetermined threshold displacement, executed triggering module 424 may store notification data 404 within a portion of memory 105 and re-compute the displacement between the geographic position specified by geospatial coordinates 330 and the geographic position of client device 102, and the compare the re-computed displacement against the predetermined threshold displacement, after an expiration of a predetermined temporal delay (e.g., thirty seconds, one minute, five minutes, etc.).

Referring back to FIG. 4A, executed interface element generation module 428 may perform operations that generate and route interface elements 430 to display unit 109A. In some instances, when rendered for presentation within a corresponding notification interface 432 by display unit 109A, interface elements 430 provide a graphical representation of payment notification 402 and incentive notification 414 to user 101 within a single display screen or window, or across multiple display screens or windows, of notification interface 432 (e.g., in accordance with the one or more elements of layout data, as described herein). For example, as illustrated in FIG. 4A, display unit 109 may present a first portion 430A of interface elements 430 associated with payment notification 402 and a second portion 430B of interface elements 430 associated with incentive notification 414 within a single display screen or window of notification interface 432.

The interface elements of first portion 430A may, when presented within notification interface 432, provide a graphical representation of payment notification 402 and prompt user 101 to approve or reject the US $6.60 payment requested by Barry's Coffee Shop for the purchased large coffee and blueberry muffin, e.g., based on additional input provided to input device 109B of client device 102 that selects a respective one of an "APPROVE" icon 434 and a "REJECT" icon 436 presented within notification interface 432. Further, the interface elements of second portion 430B may, when presented within notification interface 432, provide a graphical representation of interface notification 414 and prompt user 101 to accept, or reject, the offered additional of the expresso shot to the purchase coffee for US 99¢ by providing further input to a respective one of an "ACCEPT" icon 440 and a "DECLINE" icon 442 presented within digital interface 432. In some instances, by triggering the presentation of interface elements representative of payment notification 402 and incentive notification 414 based on a determination that the displacement between the actual geographic position of merchant 111 and the current geographic position of client device 102 fails to exceed the predetermined threshold value, certain of the exemplary processes described herein enable user 101 to not only view these interface elements in real-time and contemporaneously with the initiation the purchase transaction with merchant 111, but also to view these elements when user 101 and client device 102 are disposed proximate to merchant 111, e.g., proximate to Barry's Coffee Shop within the Georgetown neighborhood of Washington, D.C.

In some instances, not illustrated in FIG. 4A, user 101 may elect to approve the $6.60 payment requested by merchant 111 for the purchase of the large coffee and the blueberry muffin, and user 101 may provide input to client device 102 (e.g., via input unit 109B) that selected "APPROVE" icon 434. Based on the input, executed mobile banking application 108 may perform operations (not illustrated in FIG. 4A), that generate and transmit a confirmation of the approved payment across network 120 to FI computing system 130, which may perform operations that, in real-time, debit the $6.60 from an account held by user 101 and associated with the selected payment instrument, and that credit the $6.60 to the financial services account associated with merchant 111 and specified within RFP message 226 (e.g., either directly, if the financial institution issues the financial services account associated with merchant 111, or based on additional ISO-20022-compliant RTP messages exchanged with computing systems associated with other financial institution). FI computing system 130 may also perform operations that access RFP message 226 maintained within RFP queue 305, and delete RFP message 226 from RFP queue 305, e.g., based on the approval by user 101 and the real-time clearance and settlement of the approved payment.

Further, FI computing system 130 may also perform operations that transmit one or more messages to merchant computing system 110 that confirm the approval of the requested payment by user 101 and the real-time clearance and settlement of the approved payment, either directly across network 120 or through one or more of computing systems or devices 246 associated with participants in the RTP ecosystem (e.g., additional ISO-20022-compliant messages, etc.). Based on the one or more messages, merchant computing system 110 may perform operations that enable merchant 111 to execute the initiated purchase transaction and provision the purchased large coffee and blueberry muffin to user 101.

In other instances, and based on confirmation data indicating a rejection by user 101 of the requested payment (e.g., based on additional input selecting "REJECT" icon 436), FI computing system 130 may perform operations that delete RFP message 226 from RFP queue 305, and generate and transmit one or more messages to merchant computing system 130 indicative of the rejected payment, either directly across network 120 or through one or more of computing systems or devices 246 associated with participants in the RTP ecosystem (e.g., additional ISO-20022-compliant messages, etc.). Based on the indication of the rejection of the requested payment by user 101 (e.g., due to potential fraud, etc.), merchant computing system 110 may perform operations that enable merchant 111 to cancel the initiated purchase transaction in real-time and with delays and chargebacks characteristic of the transaction reconciliation, clearance, and settlement processes involving payment rails and transaction processing-messages.

Further, in some instances, user 101 may elect to accept the offered purchase incentive (e.g., the addition of the espresso shot to the large coffee for 99¢), and user 101 may provide additional input to client device 102 (e.g., via input unit 109B) that selects "ACCEPT" icon 440. Based on the additional input, executed mobile banking application 108 may perform operations that trigger an execution of merchant application 106 (e.g., through a programmatic instruction, etc.), and executed merchant application 106 may perform operations that initiate an additional purchase of the 99¢ espresso shot using any of the exemplary processes described herein.

In some examples, FI computing system 130 may select, and provision to client device 102, one or more incentive notifications that characterize corresponding incentives offered to user 101 by the merchant involved in the initiated purchase transaction, e.g., Barry's Coffee Shop disposed within the Georgetown neighborhood of Washington, D.C. In other instances, FI computing system 130 may select one or more additional, or alternate, incentives offered to customers of the financial institution, such as user 101, by corresponding merchants disposed along a route travelled by user 101, and as such, by client device 102, when collecting the purchased products from the actual, physical location of merchant 111 (e.g., collecting the purchased large coffee and blueberry muffin Barry's Coffee Shop disposed within the Georgetown neighborhood of Washington, D.C.), or disposed within a locality or other geographic region that includes merchant 111 (e.g., the Georgetown neighborhood of Washington, D.C.).

Figure 4B:
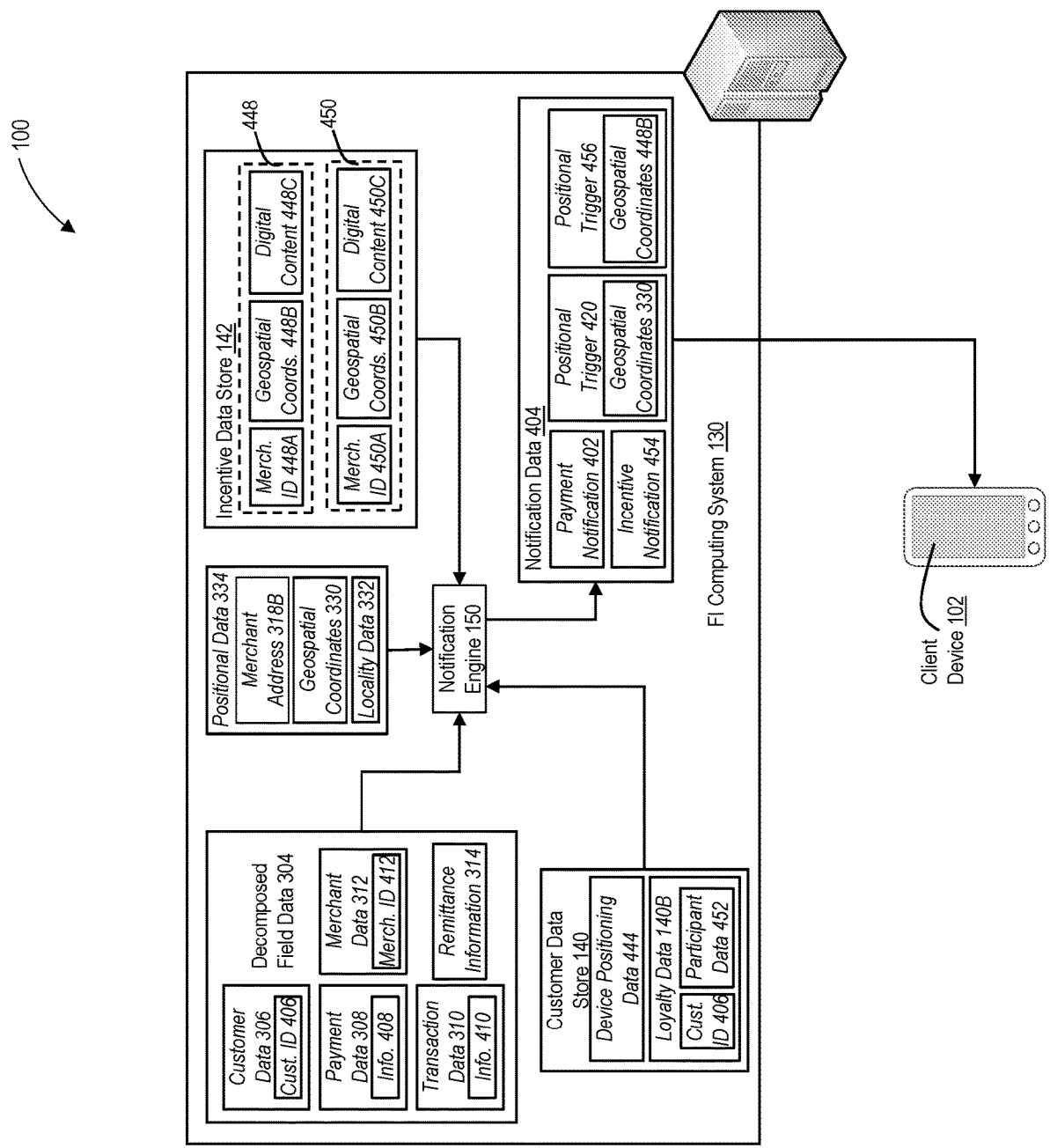

Referring to FIG. 4B, executed notification engine 150 may perform operations that access customer data store 140 maintained within data repository 134, and that obtain a device positional data 444 specifying a current geographic position of client device 102. For example, customer data store 140 may maintain device positional data 444 in conjunction with one or more identifiers of user 101, such as, but not limited to, customer identifier 406, and device positional data 444 may include a set of geospatial coordinates that collectively specify the current geographic position of client device 102, along with elements of temporal data that specify a time or date at which positional unit 109D of client device 102 captured or determined the current geographic position.

In some instances, the geospatial coordinates that specify the current geographic position of client device 102, and the geospatial coordinates of the actual, physical location of merchant 111, may represent respective initial and final positions along a route travelled by client device 102, and as such, by user 101, to collect the purchased products from merchant 111 (e.g., to collect the purchased large coffee and blueberry muffin Barry's Coffee Shop disposed within the Georgetown neighborhood of Washington, D.C.). To determine one or more discrete geographic positions (and corresponding geospatial coordinates that specify each of the discrete geographic positions) along that route, executed notification engine 150 may perform operations (not illustrated in FIG. 4B) that package the geospatial coordinates that specify the current geographic position of client device 102 and the actual, physical location of merchant 111 into corresponding portions of a route request, which FI computing system 130 may transmit across network 120 to geocoding API 326 of mapping computing system 130.

Based on a successful validation of a structure of composition of the route request by geocoding API 326, mapping computing system 322 may perform operations that parse the route request, identify the geospatial coordinates associated with the initial and final positions of the route, and generate elements of routing data 446 that include geospatial coordinates of discrete geographic positions disposed along an expected route travelled by client device 102, and as such, by user 101, when collecting the purchased products from merchant 111 during a corresponding temporal interval. Mapping computing system 130 may transmit routing data 446 across network 120 to FI computing system 130, and executed notification engine 150 may receive and store routing data 446 within a tangible, non-transitory memory, such as data repository 134 (not illustrated in FIG. 4B).

Referring back to FIG. 4B, executed notification engine 150 may perform any of the exemplary processes described herein to access the structured or unstructured data records of incentive data store 142, and to identify a subset of the data records that include, or reference, geographic positions (and corresponding geospatial coordinates) disposed within a predetermined, threshold distance of one or more of the geographic positions (and corresponding geospatial coordinates) specified within routing data 445, which define the expected route travelled by client device 102, and as such, by user 101, when collecting the purchased products from merchant 111. For example, the subset of data records may include: (i) data record 448 associated with local bookstore that provides a 10% discount on purchases made by customers of the financial institution, and an additional 10% discount (e.g., for a total discount of 20%) for customers of the financial institution that are also participants in a loyalty program managed by the bookstore; and (ii) data record 450 associated with local deli that provides a 10% discount on purchases made by customers of the financial institution. Each of data records 448 and 450 include a corresponding merchant identifier (e.g., merchant identifier 448A that include a name of the bookstore, merchant identifier 450A that includes a name of the deli, etc.), corresponding elements of geographic data (e.g., geospatial coordinates 448B and 450B associated with actual, physical locations of respective ones of the bookstore and deli, etc.), and corresponding elements of digital content (e.g., digital content 448C establishing the merchant-specific incentive associated with bookstore, digital content 450C establishing the merchant-specific incentive associated with deli, and corresponding elements of layout data, etc.).

In some instances, executed notification engine 150 may perform any of the exemplary processes described herein to package each of the elements of digital content 448C and 450C into corresponding elements of bookstore- and deli-specific incentive notifications within notification data 404, along with corresponding bookstore- and deli-specific positional triggers (e.g., respective ones of geospatial coordinates 448B and 450B). In other examples, executed notification engine 150 may select the merchant-specific incentive associated with a corresponding one of data records 448 and 450 based on a determine participation, or lack of participation, of user 101 in one or more merchant-specific loyalty programs. For example, as illustrated in FIG. 4B, executed notification engine 150 may access loyalty data 140B maintained within customer data store 140 of data repository 134, and may obtain one or more elements of participant data 452 that identifies and characterizes one or more merchant-specific loyalty programs in which user 101 participates. For example, loyalty data 140B may associate participant data 452 with one or more identifiers of user 101, such as customer identifier 406, and based on an analysis of participant data 452, executed notification engine 150 may determine that user 101 participates in the loyalty program managed by the bookstore (e.g., based on a determination that participant data includes merchant identifier 448A of the bookstore).

Based on the determination that user 101 participates in the loyalty program managed by the bookstore, executed notification engine 150 may elect to provision the bookstore-specific purchase incentive to user 101 (e.g., 20% discount for purchases made by customers of the financial institution that are also participants in the loyalty program managed by the bookstore). Executed notification engine 150 may generate an incentive notification 454 that includes all, or a selected portion, of the elements of digital content 448C that establish the bookstore-specific incentive (along with the corresponding elements of layout data, as described herein), and may package incentive notification 454 into a corresponding portion of notification data 404, along with payment notification 402 and a payment-specific positional trigger, such as positional trigger 420 described herein. Further, in some instances, executed notification engine 150 may also perform operations that generate an incentive-specific positional trigger 454 associated with incentive notification 454, and package positional trigger 456 into a corresponding portions of notification data 404, e.g., in conjunction with payment notification 402, positional trigger 420, and incentive notification 454. For example, positional trigger 456 may include geospatial coordinates 448B of the actual, physical location of the bookstore (e.g., as obtained from data record 448), and executed notification engine 150 may perform operations that cause FI computing system 130 to transmit notification data 404 across network 120 to client device 102.

In some instances, as described herein, API 422 may receive notification data 404 and route notification data 404 to executed mobile banking application 108 (e.g., through a generation of a programmatic command, etc.). Further, although not illustrated in FIG. 4B, executed triggering module 424 of mobile banking application 108 may parse notification data 404, obtain, from positional trigger 420, geospatial coordinates 330 of the actual, physical location of Barry's Coffee Shop at 3301 M Street NW, Washington, D.C., 20007 (e.g., 38.905 N latitude, 77.067 W longitude), and obtain, from positional trigger 456, geospatial coordinates 448B of the actual, physical location of the bookstore within the Georgetown neighborhood of Washington, D.C. Executed triggering module 424 may also perform any of the exemplary processes described herein to obtain data identifying a current geographic position of client device 102 (e.g., directly from provisional unit 109D or from a portion of memory 105), and to compute displacements between the current geographic position of client device 102 and each of (i) the geographic position specified by geospatial coordinates 330 (e.g., the actual, physical location of Barry's Coffee Shop at 3301 M Street NW, Washington, D.C., 20007) and (ii) the geographic position specified by geospatial coordinates 448B (e.g., the actual, physical location of the bookstore within the Georgetown neighborhood of Washington, D.C.).

Although not illustrated in FIG. 4B, executed triggering module 424 may determine that the computed displacement between the current geographic position of client device 102 and the geographic position specified by geospatial coordinates 448B fails to exceed predetermined threshold displacement described herein, and as such, that client device 102, and user 101, are each disposed proximate to the actual, physical location of the bookstore. Based on the determination that the computed displacement fails to exceed the predetermined threshold displacement, executed triggering module 424 may provide incentive notification 454 as input to executed interface element generation module 428, which may perform any of the exemplary processes described herein to generate interface elements that, when rendered for presentation within notification interface 432 by display unit 109A, identify the 20% discount available to customers of the financial institution that also participate in the loyalty program managed by the bookstore, and that prompt user 101 to enter the bookstore and apply the discount to a corresponding purchase transaction (not illustrated in FIG. 4B).

Further, and based on an additional determination that the computed displacement between the current geographic position of client device 102 and the geographic position specified by geospatial coordinates 330 fails to exceed predetermined threshold displacement described herein, and as such, that client device 102, and user 101, are each disposed proximate to the actual, physical location of the Barry's Shop, executed triggering module 424 may provide payment notification 402 as input to executed interface element generation module 428. Although not illustrated in FIG. 4B, executed interface element generation module 428 may perform any of the exemplary processes described herein to generate additional interface elements that, when rendered for presentation within notification interface 432 by display unit 109A, prompt user 101 to approve, reject, or defer the $6.60 payment requested by Barry's Coffee Shop for the purchased large coffee and blueberry muffin.

In some instances, by triggering the presentation of interface elements representative of payment notification 402 and incentive notification 454 based on a determine proximity of client device 102 to respective ones of merchant 111 and the bookstore, certain of the exemplary processes described herein enable user 101 to not only view these interface elements prompting approval of the requested payment in real-time and contemporaneously with the initiation of the purchase transaction with merchant 111, but also when user 101 and client device 102 are disposed proximate to merchant 111, e.g., proximate to Barry's Coffee Shop within the Georgetown neighborhood of Washington, D.C. Further, by provisioning an incentive-specific geographic trigger within notification data 404, certain of the exemplary processes described herein may enable user 101 to view interface elements representative of a corresponding merchant-specific incentive in real-time and responsive to an established proximity between the actual, physical location of the merchant associated with the merchant-specific incentive and the current geographic position of client device 102, and as such, user 101, even if merchant 111 and the merchant associated with the merchant-specific incentive are themselves not disposed proximately within the corresponding geographic region.

Figure 5:
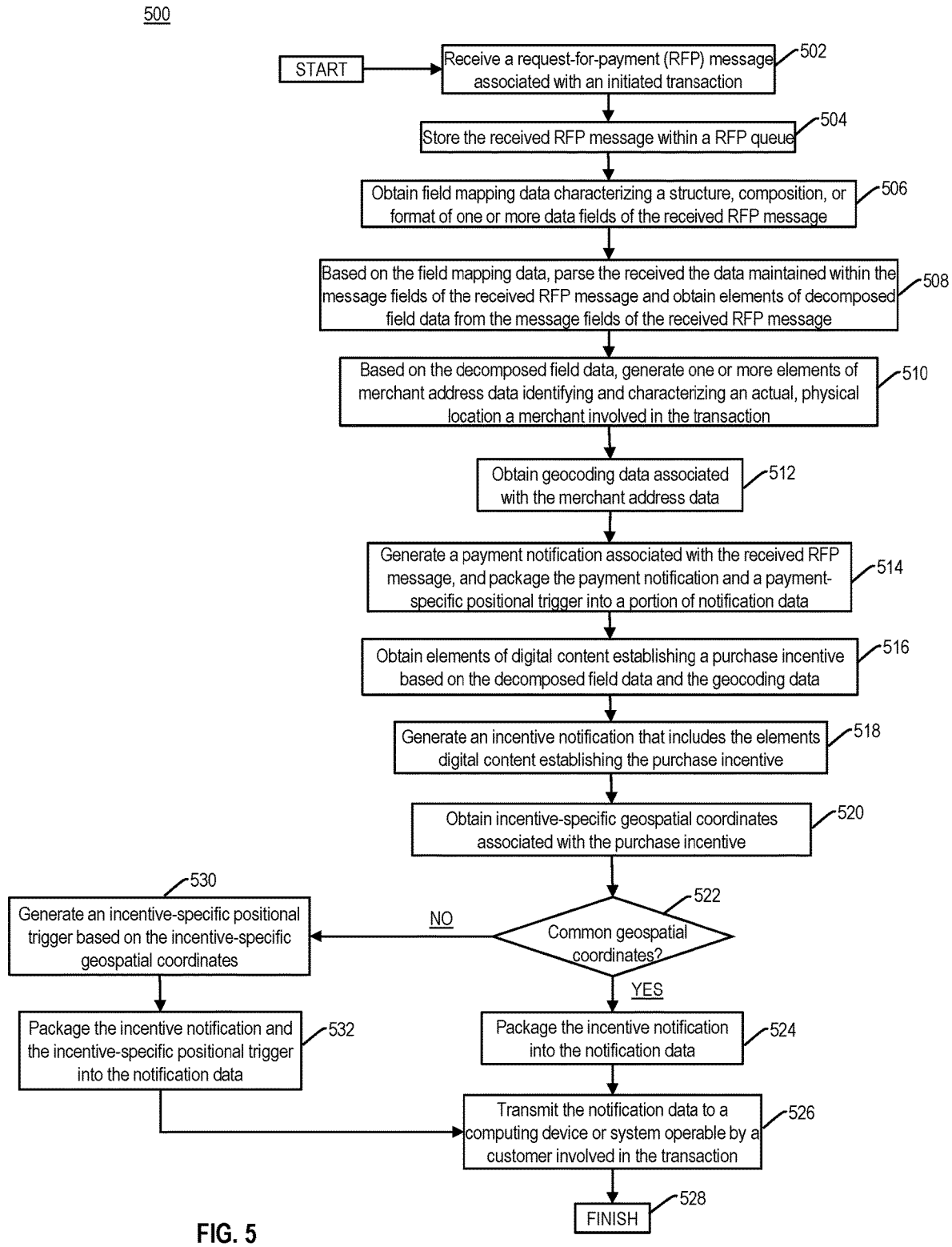
FIG. 5 is a flowchart of an exemplary process for determining a geographic position associated with a transaction based on a RFP message, and for provisioning elements of digital content of relevance to the determined geographic position to a computing device in real-time and contemporaneously with the initiation of the transaction, in accordance with some exemplary embodiments.

FIG. 5 is a flowchart of an exemplary process 500 for determining a geographic position associated with a transaction based on a request-for-payment (RFP) message formatted and structured in accordance with one or more standardized data-exchange protocols, and for provisioning elements of digital content of relevance to the determined geographic position to a computing device associated with one or more counterparties to the transaction, in real-time and contemporaneously with the initiation of the transaction. For example, one or more computing systems associated with a financial institution, such as FI computing system 130, may perform one or more of the exemplary steps of exemplary process 500.

Referring to FIG. 5, FI computing system 130 may perform any of the exemplary processes described herein to receive a RFP message associated with a transaction initiated between corresponding counterparties (e.g., in step 502). As described herein, the transaction may correspond to a purchase transaction initiated between a customer associated with a corresponding computing device (e.g., user 101 associated with client device 102) and a merchant associated with a corresponding computing system (e.g., merchant 111 associated with merchant computing system 110), and the purchase transaction may involve one or more products or services offered for sale by merchant 111 and purchased by user 101 (e.g., the large coffee and blueberry muffin, etc.). The RFP message may be generated by merchant computing system 110 using any of the exemplary processes described herein, and in some instances, FI computing system 130 may receive the RFP message directly from merchant computing system 110 across a corresponding communications network (e.g., network 120), or may receive the RFP message from one or more intermediate computing systems or devices associated with corresponding participants in a real-time payments (RTP) ecosystem, as described herein.

As described herein, the received RFP message may include message fields consistent with the ISO 20022 standard for electronic data exchange between financial institutions, and each of the message fields may be populated with data structured and formatted in accordance with the ISO 20022 standard. By way of example, the received, ISO-20022-compliant RFP message may include, among other things: (i) message fields populated with data specifying a full name and postal address of user 101; (ii) message fields populated with data identifying a payment instrument selected by user 101 to fund the initiated purchase transaction; (iii) message fields populated with data specifying a name and postal address of merchant 111; (iv) message fields populated with data identifying a financial services account held by merchant 111 and available to receive processed from the requested payment; and (v) message fields populated with one or more parameter values that characterize the initiated purchase transaction, a requested payment method, and/or a requested payment date. Further, and as described herein, the received, ISO-20022-compliant RFP message may also include structured or unstructured message fields that specify additional remittance information associated with the initiated purchase transaction, and examples of the additional remittance information include, but are not limited to, information identifying a product or service involved in the initiated purchase transaction, or a link to remittance data associated with the initiated transaction (e.g., a long-form URL or shortened to a PDF or HTML invoice, as described herein).

Referring back to FIG. 5, FI computing system 130 may store the received RFP message 226 within a corresponding portion of locally accessible data repository, such as within RFP queue 135 of data repository 134 (e.g., in step 504 of FIG. 5), and may obtain, from the locally accessible data repository, one or more elements of field mapping data that characterize a structure, composition, or format of one or more data fields of the received RFP message (e.g., in step 506 of FIG. 5). Based on the obtained elements of the field mapping data, FI computing system 130 may perform any of the exemplary processes described herein to parse the data maintained within the message fields of the received RFP message, and to obtain elements of decomposed field data that identify and characterize user 101, merchant 111, the initiated purchase transaction, and the payment requested from user 101 by merchant 111 for the purchased products or services (e.g., in step 508 of FIG. 5). For example, the elements of decomposed field data may include, but are not limited to, customer data that identifies a full name or address of user 101, payment data that identifies a requested payment date or a payment instrument selected by user 101 to fund the purchase transaction, transaction data that identifies a requested payment amount or a requested payment currency, and merchant data that includes a name of merchant 111, a postal address associated with merchant 111, or information identifying a merchant account capable of receiving proceeds from the purchased transaction. Further, and as described herein, the elements of decomposed field data may also include additional elements of structured or unstructured remittance data, such as, but not limited to, a long-form URL or a shortened URL that point to elements of formatted receipt data (e.g., in PDF or HTML form) associated with the initiated purchase transaction and maintained at one or more additional computing systems, such as merchant computing system 110.

Based on portions of the decomposed field data, FI computing system 130 may perform any of the exemplary processes described herein, either individually or various combinations, to generate one or more elements of merchant address data identifying and characterizing an actual, physical location of merchant 111 (e.g., in step 510 of FIG. 1). For instance, in step 510, FI computing system 130 may perform any of the exemplary processes described herein to compare the postal address of merchant 111 (e.g., as specified within the decomposed field data) against a locally maintained databased of generic postal addresses, and based on the comparison, to determine whether the specified postal address of merchant 111 corresponds to the actual, physical location of merchant 111 (e.g., from which user 101 may collect the purchased products or obtain the purchased services), or a generic address associated with a corporate parent of merchant 111 or a franchisee of merchant 111. Based on a determination that the specified postal address of merchant 111 corresponds to the actual, physical location (e.g., that the specified postal address is not included within the database of generic addresses), FI computing system 130 may perform any of the exemplary processes described herein to package the specified postal address of merchant 111 into the elements of merchant address data (e.g., also in step 510).

In some instances, FI computing system 130 may also perform any of the exemplary processes described herein (e.g., in step 510) to parse a long-form URL included within the decomposed field data to obtain additional, or alternate, elements of the merchant address data identifying and characterizing the actual, physical location of merchant 111, such as, but not limited to, an actual postal code of merchant 111. Further, in some instances, FI computing system 130 may also perform any of the exemplary processes described herein (e.g., in step 510) to a long-form URL, or a shortened URL, included within the decomposed field data, to obtain the elements of formatted receipt data (e.g., in PDF or HTML form) associated with the initiated purchase transaction and linked to the long-form or shortened URL, and to process the elements of formatted received data to obtain additional, or alternate, elements of the merchant address data that identify and characterize the actual, physical location of merchant 111 (e.g., also in step 510). In other instances, also in step 510, FI computing system 130 may perform any of the exemplary processes described herein to determine one or more of the elements of the merchant address data that identify and characterize the actual, physical location of merchant 111 based on an analysis of elements of transaction data characterizing prior purchase transactions initiated by user 101 or client device 102 during a predetermined, prior temporal interval, or based on a geographic position of client device 102 at, or within a predetermined temporal interval that includes, a transaction time associated with the purchase transaction involving user 101 and merchant 111.

FI computing system 130 may also perform any of the exemplary processes described herein to obtain one or more elements of geocoding data associated with elements of merchant address data that identify and characterize the actual, physical location of merchant 111 (e.g., in step 512 of FIG. 5). The obtained elements of geocoding data may include a set of geospatial coordinates (e.g., latitude, longitude, altitude, etc.) associated with the elements of merchant address data and additionally, or alternatively, elements of locality data that identify one or more administrative areas, localities, or neighborhoods that include the actual, physical location of merchant 111.

In some instances, and to obtain the one or more elements of geocoding data in step 512, FI computing system 130 may perform any of the exemplary processes described herein to package at least a portion of the merchant address data into a corresponding geocoding request, and to transmit the geocoding request across network 120 to a programmatic interface established and maintained by a mapping computing system, such as geocoding API 326 of mapping computing system 322. As described herein, mapping computing system 322 may perform operations that parse the geocoding request and obtain the elements of merchant address data, and that map the elements of merchant address data to the corresponding set of geospatial coordinates (e.g., latitude, longitude, or altitude associated with the elements of merchant address data, etc.) and to the corresponding elements of locality data (e.g., that identify one or more administrative areas, localities, or neighborhoods that are associated with, and that include, the actual, physical location of merchant 111). Mapping computing system 322 may package the set of geospatial coordinates and the elements of locality data into corresponding portions of the requested geocoding data, and the mapping computing system may transmit the geocoding data across network 120 to FI computing system 130.

By way of example, the elements of merchant address data included within the geocoding request may specify the actual, physical address of Barry's Coffee Shop (e.g., merchant 111) at 3301 M Street NW, Washington, D.C., 20007. Based on the elements of merchant address data, the mapping computing system may perform operations that map the actual, physical address of 3301 M Street NW, Washington, D.C., 20007, to the set of geospatial coordinates that include 38.905 N latitude and 77.067 W longitude. Further, the mapping computing system may generate the elements of locality data that specify a disposition of the actual, physical address of 3301 M Street NW, Washington, D.C., 20007, within the "Georgetown" neighborhood of Washington, D.C. The mapping computing system may package the set of geospatial coordinates (e.g., 38.905 N latitude, 77.067 W longitude) and the elements of locality data (e.g., identifying the "Georgetown" neighborhood of Washington, D.C.) into corresponding portions of the geocoding data, which mapping computing system 322 may transmit across network 120 to FI computing system 130.

Referring back to FIG. 5, FI computing system 130 may perform any of the exemplary processes described herein to generate one or more elements of a payment notification associated with the queued RFP message based on all, or a selected portion, of the decomposed field data, and to generate a payment-specific positional trigger associated with the payment notification and the actual, physical location of merchant 111 (e.g., in step 514 of FIG. 5). By way of example, and as described herein, the payment notification may be associated with the requested payment, and that payment notification may include, among other things, the full name of user 101, the requested payment date, information identifying the selected payment instrument, and additionally, or alternatively, the requested payment amount and payment currency. Further, and as described herein, the payment-specific positional trigger may include the geospatial coordinates associated with the actual, physical location of merchant 111. In some instances, FI computing system 130 may perform operations that generate notification data including the payment notification and the payment-specific positional trigger (e.g., also in step 514 of FIG. 5).

FI computing system 130 may also perform any of the exemplary processes described herein that, based on the geocoding data and the decomposed field data, identify and obtain one or more elements of digital content that establish a purchase incentive of potential relevant to user 101 (e.g., in step 516 of FIG. 5), and may generate an incentive notification that includes that includes all, or a selected portion of the digital content that establishes the purchase incentive (e.g., in step 518 of FIG. 5). In some instances, the established purchased incentive may be associated with merchant 111 and may, among other things, offer user 101 a discount on a purchase of an additional product at merchant 111 or offer user 101 an opportunity to enroll in a loyalty program associated with merchant 111 in exchange to a predetermined number of loyalty points. In further instances, the established purchased incentive may be associated with an additional, or alternate, merchant having an actual, physical location disposed along a route traversed by user 101 between a current geographic position of client device 102 and the actual, physical location of merchant 111, or with an additional, or alternate, merchant that manages a loyalty program within which user 101 participates. The disclosed embodiments are, however, not limited to these examples of merchant-specific purchase incentives, and in other instances, the established purchase incentive may be associated with any additional, or alternate, merchant of potential interest to user 101 and of potential relevance to merchant 111, the actual, physical location of merchant 111, or the initiated purchase transaction.

In some instances, FI computing system 130 may perform any of the exemplary processes described herein to obtain geospatial coordinates associated with the purchase incentive (e.g., in step 520 of FIG. 5), and to determine whether the geospatial coordinates associated with the purchase incentive are consistent with, and identical to, the geospatial coordinates associated with the actual, physical location of merchant 111 (e.g., in step 522). If, for example, FI computing system 130 were to determine that the actual, physical location of merchant 111 and the purchase incentive are associated with a common set of geospatial coordinates (e.g., step 522; YES), FI computing system 130 may determine that the each of the payment and incentive notifications are associated with a common positional trigger, e.g., the payment-specific positional trigger described herein, and FI computing system 130 may perform any of the exemplary processes described herein into package the incentive notification into a corresponding portion of the notification data (e.g., in step 524 of FIG. 5). FI computing system 130 may transmit the notification data across network 120 to a computing system or device associated with user 101, such as client device 102 that initiated the transaction using any of the exemplary processes described herein (e.g., in step 526 of FIG. 5), and exemplary process 500 is then complete in step 528.

Alternatively, if FI computing system 130 were to determine that the actual, physical location of merchant 111 and the purchase incentive are associated with different sets of geospatial coordinates (e.g., step 522; NO), FI computing system 130 may perform any of the exemplary processes described herein to generate an incentive-specific positional trigger that includes the set of geospatial coordinates associated with the purchase incentive (e.g., in step 530 of FIG. 5), and to package the incentive notification and the incentive-specific positional trigger into a corresponding portion of the notification data (e.g., in step 532). Exemplary process 500 may then pass back to step 526, and FI computing system 130 may transmit the notification data across network 120 to a computing system or device associated with user 101, such as client device 102. Exemplary process 500 is then complete in step 528.

III. Exemplary Hardware and Software Implementations

Embodiments of the subject matter and the functional operations described in this disclosure can be implemented in digital electronic circuitry, in tangibly-embodied computer software or firmware, in computer hardware, including the structures disclosed in this specification and their structural equivalents, or in combinations of one or more of them. Embodiments of the subject matter described in this disclosure, including merchant application 106, mobile banking application 108, decomposition engine 146, analytical engine 148, notification engine 150, APIs 214, 302, and 422, RTP engine 216, address analysis module 316, geocoding module 320, geocoding API 326, URL processing module 336, remittance analysis module 358, triggering module 424, and interface element generation module 428, can be implemented as one or more computer programs, i.e., one or more modules of computer program instructions encoded on a tangible non-transitory program carrier for execution by, or to control the operation of, a data processing apparatus (or a computing system). Additionally, or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) or an assisted Global Positioning System (AGPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, such as user 101, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the disclosure or of what may be claimed, but rather as descriptions of features specific to particular embodiments of the disclosure. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, unless otherwise specifically defined herein, all terms are to be given their broadest possible interpretation including meanings implied from the specification as well as meanings understood by those skilled in the art and/or as defined in dictionaries, treatises, etc. It is also noted that, as used in the specification and the appended claims, the singular forms "a," "an," and "the" include plural referents unless otherwise specified, and that the terms "comprises" and/or "comprising," when used in this specification, specify the presence or addition of one or more other features, aspects, steps, operations, elements, components, and/or groups thereof. Moreover, the terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship. In this disclosure, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only and are not to be construed as limiting the described subject matter.

The foregoing is provided for purposes of illustrating, explaining, and describing embodiments of this disclosure. Modifications and adaptations to the embodiments will be apparent to those skilled in the art and may be made without departing from the scope or spirit of the disclosure.

What is claimed is:

1. An apparatus comprising:
a communications interface;
a memory storing instructions; and
at least one processor coupled to the communications interface and to the memory, the at least one processor being configured to execute the instructions to:
receive, via the communications interface, a message associated with a transaction involving a first counterparty and a second counterparty;
determine a first geographic position of the first counterparty based on a uniform resource locator disposed within one or more message fields of the message; and
based on the first geographic position, transmit, via the communications interface, notification data to a device operable by the second counterparty, the notification data comprising digital content associated with at least one of the transaction, the first counterparty, or the second counterparty, and the notification data causing an application program executed at the device to present the digital content within a digital interface.

2. The apparatus of claim 1, wherein the message comprises elements of message data characterizing a real-time payment requested from the second counterparty by the first counterparty, the elements of message data being disposed within corresponding ones of the message fields of the message, and the message fields being structured in accordance with a standardized data-exchange protocol.

3. The apparatus of claim 1, wherein the at least one processor is further configured to execute the instructions to:
obtain, from the memory, mapping data associated with the message fields of the received message; and
perform operations that obtain elements of message data from corresponding ones of the message fields based on the mapping data, the elements of message data comprising the uniform resource locator.

4. The apparatus of claim 1, wherein the at least one processor is further configured to execute the instructions to:
obtain a portion of a postal address of the first counterparty based on the uniform resource locator; and
determine the first geographic position of the first counterparty based on the portion of the postal address.

5. The apparatus of claim 4, wherein the at least one processor is further configured to execute the instructions to obtain the portion of the postal address of the first counterparty from a corresponding portion of the uniform resource locator.

6. The apparatus of claim 4, wherein:
the uniform resource locator is associated with elements of formatted data maintained by a computing system associated with the first counterparty; and
the at least one processor is further configured to execute the instructions to:
based on the uniform resource locator, perform operations that request and receive the elements of formatted data from the computing system via the communications interface; and
process the elements of formatted data, and obtain the portion of the postal address from the elements of formatted data.

7. The apparatus of claim 4, wherein the at least one processor is further configured to execute the instructions to determine geospatial coordinates associated with the first counterparty based on the portion of the postal address, the geospatial coordinates specifying the first geographic position of the first counterparty.

8. The apparatus of claim 7, wherein the at least one processor is further configured to execute the instructions to:
obtain generic postal addresses associated with potential counterparties to the transaction; and
when the generic postal addresses fail to include the portion of the postal address, determine the geospatial coordinates associated with the first counterparty based on the portion of the postal address.

9. The apparatus of claim 1, wherein the at least one processor is further configured to:
obtain candidate elements of digital content from the memory, each of the candidate elements of digital content being associated with a second geographic position;
determine that the second geographic position associated with a corresponding one of the candidate elements of digital content is disposed within a predetermined threshold distance of the first geographic position; and generate a portion of the notification data that includes the corresponding one of the candidate elements of digital content.

10. The apparatus of claim 1, wherein the at least one processor is further configured to:
obtain a second geographic position of the device operable by the second counterparty, and determine third geographic positions disposed along a travel route between the first and second geographic positions;
obtain, from the memory, a plurality of candidate elements of digital content, each of the plurality of candidate elements of digital content being associated with a fourth geographic position;
determine that the fourth geographic position associated with a corresponding one of the plurality of candidate elements of digital content is disposed within a predetermined threshold distance of at least one of the third geographic positions; and
generate a portion of the notification data that includes the corresponding one of the plurality of candidate elements of digital content.

11. The apparatus of claim 1, wherein:
the message comprises elements of message data characterizing a real-time payment requested from the second counterparty by the first counterparty;
the generated notification data comprises a payment notification associated with the real-time payment, an incentive notification that includes the digital content, and at least one positional trigger;
the at least one processor is further configured to generate the payment notification based on the elements of message data;
the at least one positional trigger comprising at least one of the first geographic position or a second geographic position associated with the digital content; and
the executed application program presents at least one of the payment notification or the incentive notification within the digital interface in accordance with the at least one positional trigger.

12. A computer-implemented method, comprising:
receiving, using at least one processor, a message associated with a transaction involving a first counterparty and a second counterparty;
determining, using the at least one processor, a first geographic position of the first counterparty based on a uniform resource locator disposed within one or more message fields of the message; and
based on the first geographic position, transmitting, using the at least one processor, notification data to a device operable by the second counterparty, the notification data comprising digital content associated with at least one of the transaction, the first counterparty, or the second counterparty, and the notification data causing an application program executed at the device to present the digital content within a digital interface.

13. The computer-implemented method of claim 12, wherein the message comprises elements of message data characterizing a real-time payment requested from the second counterparty by the first counterparty, the elements of message data being disposed within corresponding ones of the message fields of the message, and the message fields being structured in accordance with a standardized data-exchange protocol.

14. The computer-implemented method of claim 12, further comprising:

obtaining, using the at least one processor, mapping data associated with the message fields of the received message; and
performing operations, using the at least one processor, that obtain elements of message data from corresponding ones of the message fields based on the mapping data, the elements of message data comprising the uniform resource locator.

15. The computer-implemented method of claim 12, wherein:
the computer-implemented method further comprises obtaining, using the at least one processor, a portion of a postal address of the first counterparty based on the uniform resource locator; and
the determining comprises the first geographic position of the first counterparty based on the portion of the postal address.

16. The computer-implemented method of claim 15, wherein the obtaining comprises obtaining the portion of the postal address of the first counterparty from a corresponding portion of the uniform resource locator.

17. The computer-implemented method of claim 15, wherein:
the uniform resource locator is associated with elements of formatted data maintained by a computing system associated with the first counterparty;
the computer-implemented method further comprises:
based on the uniform resource locator, and using the at least one processor, performing operations that request and receive the elements of formatted data from the computing system; and
processing the elements of formatted data using the at least one processor; and
the obtaining comprises obtaining the portion of the postal address from the elements of formatted data.

18. The computer-implemented method of claim 15, further comprising determining, using the at least one processor, geospatial coordinates associated with the first counterparty based on the portion of the postal address, the geospatial coordinates specifying the first geographic position of the first counterparty.

19. The computer-implemented method of claim 12, further comprising:
obtaining candidate elements of digital content using the at least one processor each of the candidate elements of digital content being associated with a second geographic position;
determining, using the at least one processor, that the second geographic position associated with a corresponding one of the candidate elements of digital content is disposed within a predetermined threshold distance of the first geographic position; and
generating, using the at least one processor, a portion of the notification data that includes the corresponding one of the candidate elements of digital content.

20. A tangible, non-transitory computer-readable medium storing instructions that, when executed by at least one processor, cause the at least one processor to perform a method, comprising:
receiving a message associated with a transaction involving a first counterparty and a second counterparty;
determining a first geographic position of the first counterparty based on a uniform resource locator disposed within one or more message fields of the message; and
based on the first geographic position, transmitting notification data to a device operable by the second counterparty, the notification data comprising digital content associated with at least one of the transaction, the first counterparty, or the second counterparty, and the notification data causing an application program executed at the device to present the digital content within a digital interface.

* * * * *